(12) United States Patent
Uehara

(10) Patent No.: US 8,424,621 B2
(45) Date of Patent: Apr. 23, 2013

(54) OMNI TRACTION WHEEL SYSTEM AND METHODS OF OPERATING THE SAME

(75) Inventor: Yasuo Uehara, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 242 days.

(21) Appl. No.: 12/842,926

(22) Filed: Jul. 23, 2010

(65) Prior Publication Data

US 2012/0018232 A1    Jan. 26, 2012

(51) Int. Cl.
*B62D 57/00* (2006.01)

(52) U.S. Cl.
USPC .............. 180/7.1; 180/7.2; 301/5.23

(58) Field of Classification Search .................. 180/6.2, 180/7.1, 7.2; 301/5.23
See application file for complete search history.

(56) References Cited

U.S. PATENT DOCUMENTS

| | | | |
|---|---|---|---|
| 3,519,805 A | 7/1970 | Thorne-Booth | |
| 3,783,974 A | 1/1974 | Gilbert et al. | |
| 3,828,236 A | 8/1974 | Close | |
| 3,848,671 A | 11/1974 | Kern | |
| 3,918,552 A | 11/1975 | Kameyama et al. | |
| 4,075,500 A | 2/1978 | Oman et al. | |
| 4,380,049 A | 4/1983 | Makinen | |
| 4,715,460 A * | 12/1987 | Smith | 180/7.1 |
| 4,760,529 A | 7/1988 | Takata et al. | |
| 4,926,630 A | 5/1990 | Shekleton | |
| 5,046,919 A | 9/1991 | Wulf | |
| 5,186,270 A | 2/1993 | West | |
| 5,421,432 A | 6/1995 | Strambi et al. | |
| 5,434,927 A | 7/1995 | Brady et al. | |
| 5,474,370 A | 12/1995 | Ravndal | |
| 5,521,588 A | 5/1996 | Kuhner et al. | |
| 5,604,821 A | 2/1997 | Ranganathan et al. | |
| 5,739,657 A | 4/1998 | Takayama et al. | |
| 5,774,591 A | 6/1998 | Black et al. | |
| 6,246,787 B1 | 6/2001 | Hennessey et al. | |
| 6,424,370 B1 | 7/2002 | Courtney | |
| 6,556,775 B1 | 4/2003 | Shimada | |
| 6,647,324 B2 | 11/2003 | Creutzburg et al. | |
| 6,668,950 B2 * | 12/2003 | Park | 180/7.1 |

(Continued)

FOREIGN PATENT DOCUMENTS

| | | |
|---|---|---|
| DE | 10330922 | 2/2005 |
| EP | 1614585 | 1/2006 |

(Continued)

OTHER PUBLICATIONS

Ono, Shinichi, "Measurement of Flow Field Around a Wind Turbine with a Compact-type Brimmed Diffuse by a Particle Image Velocimetry", Advanced Engineering Faculty of Production of Construction Systems, pp. 1-6, (Japanese w/English Abstract).

*Primary Examiner* — Kevin Hurley
*Assistant Examiner* — Marc A Scharich
(74) *Attorney, Agent, or Firm* — Snell & Wilmer LLP

(57) ABSTRACT

The present invention is an omni traction wheel system, which adopts an integrated differential mechanism to generate longitudinal and lateral traction forces. The omni traction wheel system may include a rotary device that delivers two individually controllable rotational forces, the differential output of which may drive a plurality of peripheral wheels to rotate laterally, and the common output of which may drive a pair of longitudinal plates to rotate longitudinally. Accordingly, the omni traction wheel system may travel in all directions.

16 Claims, 17 Drawing Sheets

U.S. PATENT DOCUMENTS

| | | |
|---|---|---|
| 6,680,748 B1 | 1/2004 | Monti |
| 6,690,815 B2 | 2/2004 | Mihara et al. |
| 6,731,777 B1 | 5/2004 | Nishigaki et al. |
| 6,804,396 B2 | 10/2004 | Higaki et al. |
| 6,847,393 B2 | 1/2005 | Ashe et al. |
| 6,853,738 B1 | 2/2005 | Nishigaki et al. |
| 6,907,335 B2 | 6/2005 | Oswald et al. |
| 6,963,656 B1 | 11/2005 | Persaud et al. |
| 6,985,623 B2 | 1/2006 | Prakash et al. |
| 7,000,200 B1 | 2/2006 | Martins |
| 7,018,166 B2 | 3/2006 | Gaskell |
| 7,056,185 B1 | 6/2006 | Anagnostou |
| 7,085,693 B2 | 8/2006 | Zimmerman |
| 7,106,887 B2 | 9/2006 | Kinjo |
| 7,131,136 B2 | 10/2006 | Monroe |
| 7,142,600 B1 | 11/2006 | Schonfeld et al. |
| 7,218,011 B2 | 5/2007 | Hiel et al. |
| 7,230,538 B2 | 6/2007 | Lai et al. |
| 7,293,790 B2 | 11/2007 | Byun et al. |
| 7,340,077 B2 | 3/2008 | Gokturk et al. |
| 7,340,100 B2 | 3/2008 | Higaki et al. |
| 7,340,393 B2 | 3/2008 | Mitsuyoshi |
| 7,354,245 B2 | 4/2008 | Baba |
| 7,359,563 B1 | 4/2008 | Dua et al. |
| 7,370,466 B2 | 5/2008 | Cai |
| 7,382,244 B1 | 6/2008 | Donovan et al. |
| 7,383,238 B1 | 6/2008 | Iverson |
| 7,391,339 B2 | 6/2008 | Howard et al. |
| 7,403,640 B2 | 7/2008 | Zhang et al. |
| 7,440,615 B2 | 10/2008 | Gong et al. |
| 7,444,287 B2 | 10/2008 | Claudatos et al. |
| 7,489,802 B2 | 2/2009 | Smilansky |
| 7,621,355 B2 * | 11/2009 | Chu et al. ............ 180/7.2 |
| 7,641,288 B1 | 1/2010 | Baker et al. |
| 2002/0111794 A1 | 8/2002 | Yamamoto et al. |
| 2003/0075907 A1 | 4/2003 | Baumann et al. |
| 2005/0002561 A1 | 1/2005 | Monachino et al. |
| 2005/0063566 A1 | 3/2005 | Beek et al. |
| 2005/0071368 A1 | 3/2005 | Kim et al. |
| 2005/0085984 A1 | 4/2005 | Uhler et al. |
| 2005/0097541 A1 | 5/2005 | Holland |
| 2005/0180462 A1 | 8/2005 | Yi |
| 2005/0183896 A1 * | 8/2005 | Fenelli et al. ............ 180/65.3 |
| 2005/0267761 A1 | 12/2005 | Ueno |
| 2006/0028556 A1 | 2/2006 | Bunn et al. |
| 2006/0045354 A1 | 3/2006 | Hanna et al. |
| 2006/0104488 A1 | 5/2006 | Bazakos et al. |
| 2006/0265731 A1 | 11/2006 | Matsuda |
| 2007/0011012 A1 | 1/2007 | Yurick et al. |
| 2007/0027604 A1 | 2/2007 | Cuevas et al. |
| 2007/0098222 A1 | 5/2007 | Porter et al. |
| 2007/0140595 A1 | 6/2007 | Taylor et al. |
| 2007/0147678 A1 | 6/2007 | Gotting et al. |
| 2007/0211947 A1 | 9/2007 | Tkacik |
| 2007/0297647 A1 | 12/2007 | Hung-Chi |
| 2008/0002856 A1 | 1/2008 | Ma et al. |
| 2008/0049150 A1 | 2/2008 | Herbin et al. |
| 2008/0056548 A1 | 3/2008 | Irarrazaval et al. |
| 2008/0061559 A1 | 3/2008 | Hirshberg |
| 2008/0063273 A1 | 3/2008 | Shimodaira |
| 2008/0069400 A1 | 3/2008 | Zhu et al. |
| 2008/0095435 A1 | 4/2008 | Lipton et al. |
| 2008/0100704 A1 | 5/2008 | Venetianer et al. |
| 2008/0144961 A1 | 6/2008 | Litzenberger et al. |
| 2008/0170748 A1 | 7/2008 | Albertson et al. |
| 2008/0186386 A1 | 8/2008 | Okada et al. |
| 2008/0220692 A1 | 9/2008 | Torres et al. |
| 2008/0253617 A1 | 10/2008 | Ernst et al. |
| 2008/0260210 A1 | 10/2008 | Kobeli et al. |
| 2008/0260212 A1 | 10/2008 | Moskal et al. |
| 2008/0273765 A1 | 11/2008 | Tsujimura |
| 2008/0292151 A1 | 11/2008 | Kurtz et al. |
| 2009/0003661 A1 | 1/2009 | Ionita et al. |
| 2009/0041297 A1 | 2/2009 | Zhang et al. |
| 2009/0060287 A1 | 3/2009 | Hyde et al. |
| 2009/0087308 A2 | 4/2009 | Presz, Jr. et al. |
| 2009/0097964 A1 | 4/2009 | Presz, Jr. et al. |
| 2009/0146842 A1 | 6/2009 | Jung |
| 2009/0278325 A1 * | 11/2009 | Geels et al. ............ 280/5.28 |
| 2010/0026802 A1 | 2/2010 | Titus et al. |
| 2010/0038960 A1 | 2/2010 | Takenaka et al. |
| 2010/0096905 A1 | 4/2010 | Takenaka et al. |
| 2011/0090084 A1 | 4/2011 | Williams et al. |

FOREIGN PATENT DOCUMENTS

| | | |
|---|---|---|
| JP | 58086803 | 5/1983 |
| JP | 9058461 | 3/1997 |
| JP | 9-288573 | 11/1997 |
| JP | 09-288573 | 11/1997 |
| JP | 2003259502 | 9/2003 |
| JP | 2003338997 | 11/2003 |
| JP | 2004-005506 | 1/2004 |
| JP | 3738266 | 1/2006 |
| JP | 2006335277 | 12/2006 |
| JP | 2007094990 | 4/2007 |
| JP | 2007196867 | 8/2007 |
| JP | 2007210576 | 8/2007 |
| JP | 2008279848 | 11/2008 |
| WO | WO 86/03132 | 6/1986 |
| WO | WO 2007029454 | 3/2007 |
| WO | WO 2007039927 | 4/2007 |
| WO | WO 2007132323 | 11/2007 |

* cited by examiner

EXTERNAL GEARS

BEVEL GEARS

SPUR GEARS

HELICAL GEARS

DOUBLE HELICAL GEARS

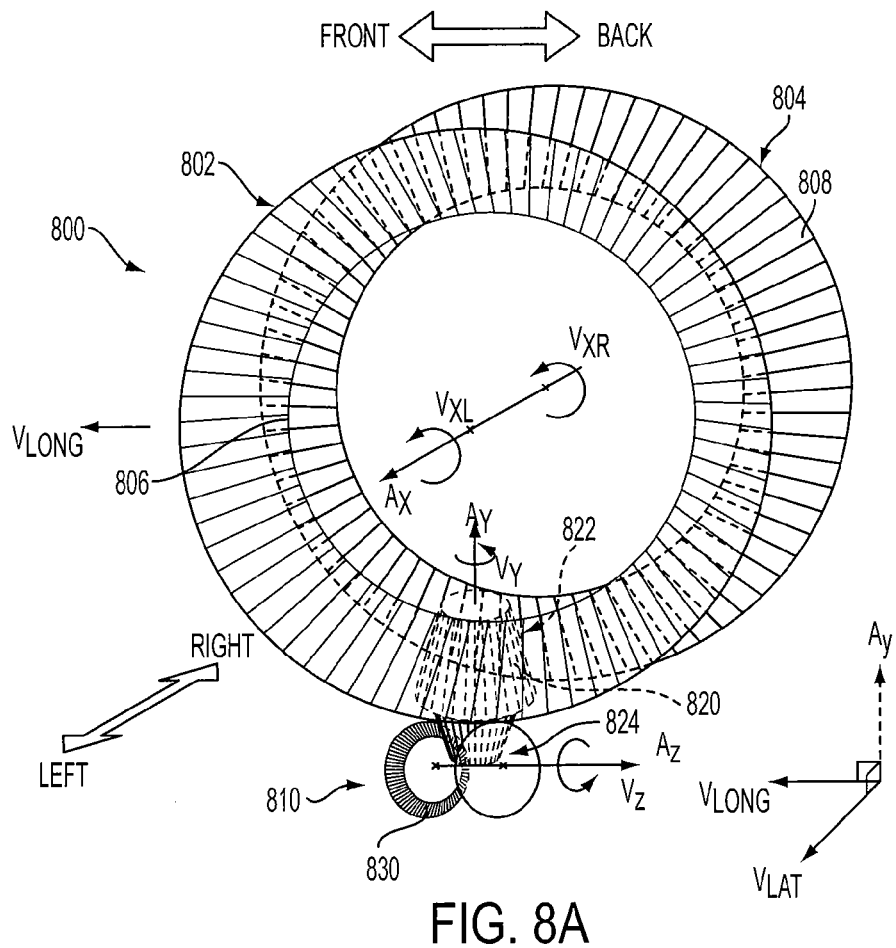
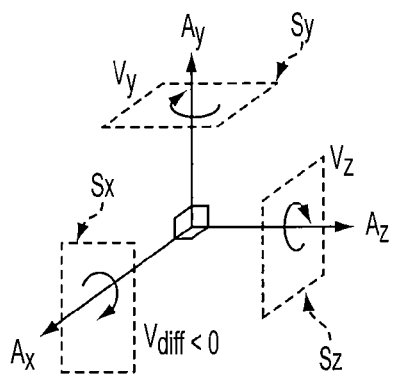
FIG. 8A
FIG. 8B
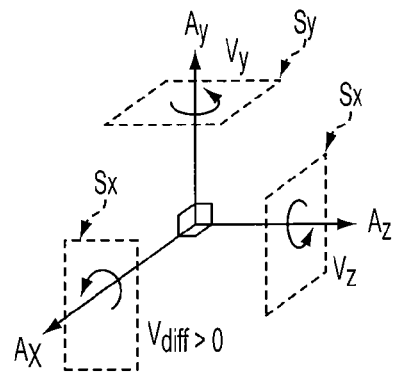
FIG. 8C

OMNI TRACTION WHEEL SYSTEM AND METHODS OF OPERATING THE SAME

BACKGROUND

1. Field

The invention relates to an omni traction wheel system. More particularly, the invention relates to an omni traction wheel system deploying an integrated differential mechanism.

2. Description of the Related Art

An omni traction wheel, also known as the omni directional wheel, is a rolling device comprises a main wheel and a set of peripheral wheels distributed along the edge of the main wheel. The main wheel may rotate forward and backward while the set of peripheral wheels may rotate left and right. As such, a transportation system deploying the omni traction wheel may travel laterally or diagonally without actually steering the main wheel. Unlike other wheel systems, the omni traction wheel system provides superb maneuverability because it can change the direction of travelling in a relatively short period of time and in a relatively small amount of space.

Because of their high maneuverability, the omni traction wheel systems are widely used in the fields of low speed transportation systems, such as electronic wheel chair system and robotic systems. Attempts have been made in the past to implement the omni traction wheel system by powering and controlling each peripheral wheel individually. However, such implementation requires a large number of electronic components, transmission gears, and rotary devices. As a result, the traditional omni traction wheel systems suffer from many drawbacks, such as bulky size, heavy weight, and large power consumption.

Therefore, a need exists in the art for a smaller size, lighter weight, and less power consuming omni traction wheel system.

SUMMARY

One aspect of the present invention is to improve the traditional omni traction wheel system by deploying an integrated differential mechanism that drives the omni traction wheel in both the longitudinal direction and the lateral direction. The advantages of the integrated differential mechanism include, but are not limited to, reducing the amount of electronic components, rotary devices, and transmission gears and creating an integrated thrust by direct tractions for the longitudinal and lateral directions. An omni traction wheel system may include a pair of longitudinal gears, a rotary device for separately and individually rotating each of the longitudinal gears, a plurality of peripheral wheel assemblies, each having a wheel member and a connecting gear for transferring the differential thrust between the pair of longitudinal gears to the wheel member.

In one embodiment, the present invention is an omni traction wheel, which may include first and second gears centrally aligned along a first axis, a plurality of peripheral wheel assemblies, each having a wheel member centrally aligned along a second axis, the second axis substantially orthogonal to the first axis, and a connecting gear having a distal end for engaging the first and second gears and a proximal end for engaging the pair of wheels, the distal end and the proximal end defining a radial axis, the radial axis substantially parallel to a common radius of the first and second gears and substantially orthogonal to the first axis and the second axis, and a rotary device for rotating the first gear about the first axis at a first angular velocity and for rotating the second gear about the first axis at a second angular velocity, whereby the connecting gear of each peripheral wheel assembly is configured to rotate its respective wheel member about the respective second axis when the first angular velocity is different from the second angular velocity.

In another embodiment, the present invention is a transportation system adopting an omni traction wheel, which may include left and right gears centrally aligned along a first axis, the left and right gears defining a cylindrical space therebetween, the cylindrical space having a circumferential region, a plurality of peripheral wheel assemblies distributed along the circumferential region of the cylindrical space, each having a pair of wheels centrally aligned along a second axis, the second axis substantially orthogonal to the first axis, and a connecting gear having a distal end for engaging the left and right gears and a proximal end for engaging the pair of wheels, the distal end and the proximal end defining a radial axis, the radial axis substantially parallel to a common radius of the left and right gears and substantially orthogonal to the first axis and the second axis and a rotary device for rotating the left gear about the first axis at a left angular velocity and for rotating the right gear about the first axis at a right angular velocity, whereby the connecting gear of each peripheral wheel assembly is configured to rotate its respective pair of wheels about the respective second axis at a lateral angular velocity defined by a difference between the left angular velocity and the right angular velocity, and whereby the connecting gear of each peripheral wheel assembly is configured to revolve along the circumferential region at a common angular velocity defined by a combination of the left angular velocity and the right angular velocity.

In yet another embodiment, the present invention is a method for operating an omni traction wheel, which may include the steps of engaging a plurality of peripheral wheels to first and second gears via a plurality of connection gears, rotating the first gear at a first angular velocity, and rotating the second gear at a second angular velocity, wherein the omni traction wheel travels laterally when the first angular velocity is different from the second angular velocity such that a connecting gear is configured to rotate a peripheral wheel.

In still yet another embodiment, the present invention is an omni traction wheel, which may include first and second plates centrally aligned along a first axis, a plurality of peripheral wheel assemblies, each having a wheel member centrally aligned along a second axis, the second axis substantially orthogonal to the first axis, and a connecting member having a distal end for engaging the first and second plates and a proximal end for engaging the wheel member, the distal end and the proximal end defining a radial axis, the radial axis substantially parallel to a common radius of the left and right plates and substantially orthogonal to the first axis and the second axis, and a rotary device for rotating the first plate about the first axis at a first angular velocity and for rotating the second plate about the first axis at a second angular velocity, whereby the connecting member of each peripheral wheel assembly is configured to rotate its respective wheel member about the respective second axis when the first angular velocity is different from the second angular velocity.

BRIEF DESCRIPTION OF THE DRAWINGS

Other systems, methods, features and advantages of the present invention will be or will become apparent to one with skill in the art upon examination of the following figures and detailed description. It is intended that all such additional systems, methods, features and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

FIG. 8A shows a high level conceptual view of the OTWS differential mechanism according to an embodiment of the present invention;

FIGS. 8B and 8C show the angular velocities of several components of the OTWS according to various embodiments of the present invention;

DETAILED DESCRIPTION

Apparatus, systems and methods that implement the embodiments of the various features of the present invention will now be described with reference to the drawings. The drawings and the associated descriptions are provided to illustrate some embodiments of the present invention and not to limit the scope of the present invention. Throughout the drawings, reference numbers are re-used to indicate correspondence between referenced elements. In addition, the first digit of each reference number indicates the figure in which the element first appears.

Figure 1A:
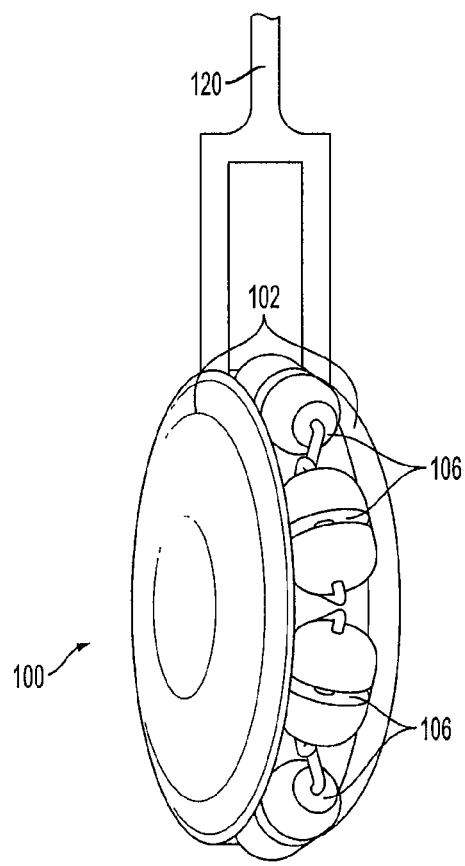
FIG. 1A shows a perspective view of the omni traction wheel system (OTWS) according to an embodiment of the present invention.

FIG. 1A shows a perspective view of an exemplary omni traction wheel system (OTWS) 100 according to an embodiment of the present invention. In general, the OTWS 100 may include a pair of main wheels formed by a pair of protective plates 102 and a plurality of peripheral wheel assemblies (PWAs) 106 located between the rims of the protective plates 102. Moreover, the OTWS 100 may be coupled to a leg 120, which integrates the OTWS 100 to a transportation system that may deploy one or more OTWSs 100. For example, the transportation system may be a wheel chair deploying four OTWSs 100, a mobile robot deploying three OTWSs 100, or a unicycle deploying one OTWS 100.

Figure 1B:
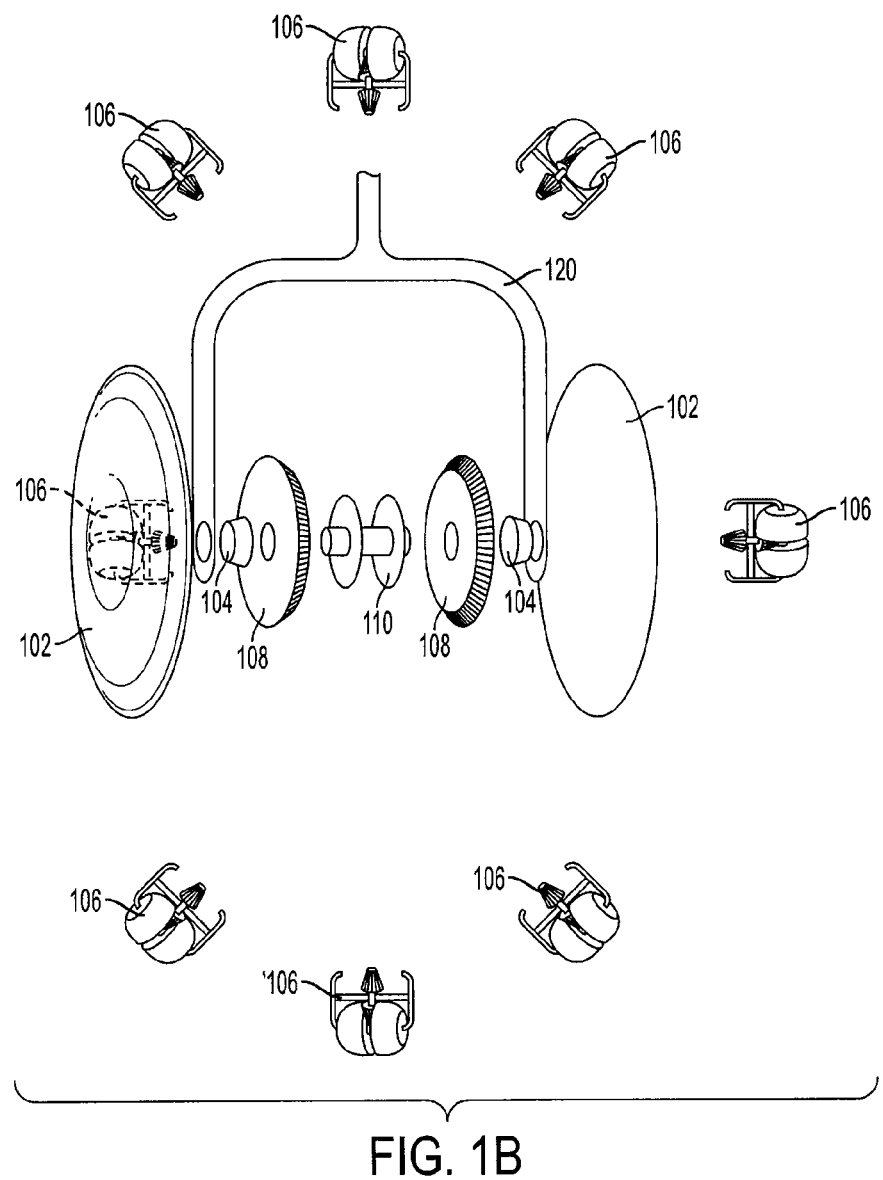
FIG. 1B shows an exploded view of the OTWS according to an embodiment of the present invention.

FIG. 1B shows an exploded view of the OTWS 100 according to an embodiment of the present invention. More specifically, the OTWS 100 may also have a pair of longitudinal gears 108 protected by the protecting plates 102, a pair of rotary devices 104 for rotating the longitudinal gears 108, a spacing member 110 that gives structural support to the OTWS 100.

Figure 2:
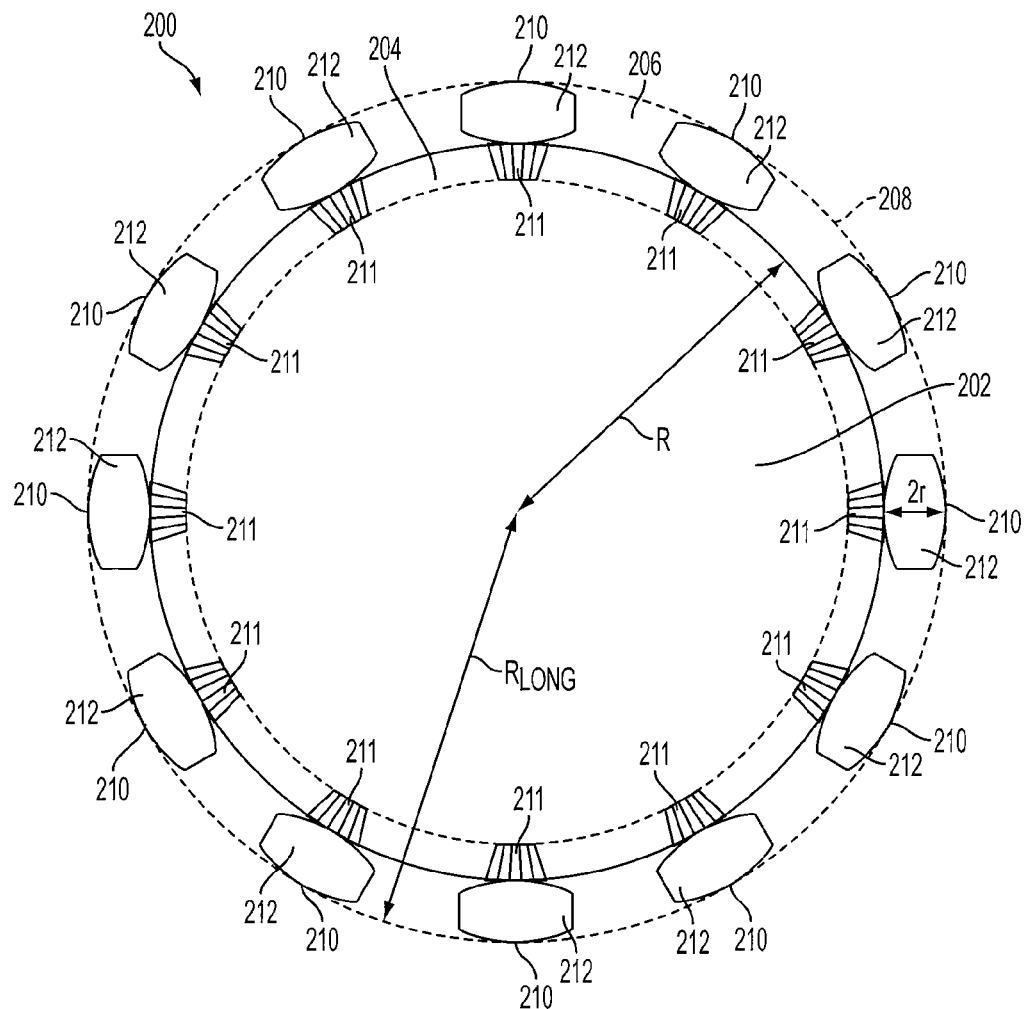
FIG. 2 shows a side view of the OTWS according to an embodiment of the present invention.

FIG. 2 shows a side view of an omni traction wheel system 200 according to an embodiment of the present invention. The OTWS 200, which is similar to the OTWS 100 of FIG. 1A, may include two longitudinal gears 202, each of which has a set of teeth along a circumference region 204. The two longitudinal gears 202 normally have a common longitudinal radius R, such that their surface areas are substantially the same. Moreover, because the two longitudinal gears 202 have a common longitudinal radius R, the circumferential regions 204 of the two longitudinal gears 202 may be identical in shape and thus hold the same number of teeth.

As shown in FIG. 2, the OTWS 200 may also include a plurality of peripheral wheel assemblies 210. According to an embodiment of the present invention, each PWA 210 may have a connecting gear 211 and a wheel member 212. The PWAs 210 may be distributed around the two longitudinal gears 202. More specifically, the connecting gear 211 of each PWA 210 may be disposed between the circumferential regions 204 of the two longitudinal gears 202 whereas the wheel member 212 of each PWA 210 may be disposed along an outer region 206. The width of the outer region 206 is defined by a lateral radius r of the wheel member 212. Accordingly, the main wheel 208 has a longitudinal radius $R_{LONG}$.

According to an embodiment of the present invention, the longitudinal radius $R_{LONG}$ may be ranged from about 10 cm to about 40 cm. More specifically, the longitudinal radius $R_{LONG}$ can be 15 cm. According to an embodiment of the present invention, the lateral radius r may be ranged from about 2 cm to about 8 cm. More specifically, the lateral radius r can be 3 cm. As such, the circumferential ratio between the longitudinal radius $R_{LONG}$ and the lateral radius r may be ranged from 1 to 20. More specifically, the circumferential ratio between the longitudinal radius $R_{LONG}$ and the lateral radius r may about 5.

Figure 3A:
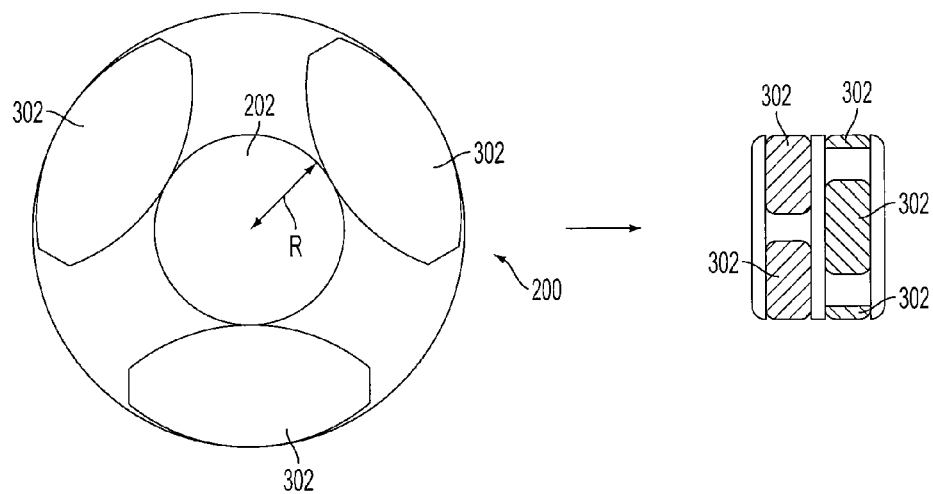
FIGS. 3A, 3B, and 3C show the side views of the OTWSs having three peripheral wheel assemblies (PWAs), four PWAs, and eight PWAs respectively according to various embodiments of the present invention.
Figure 3B:
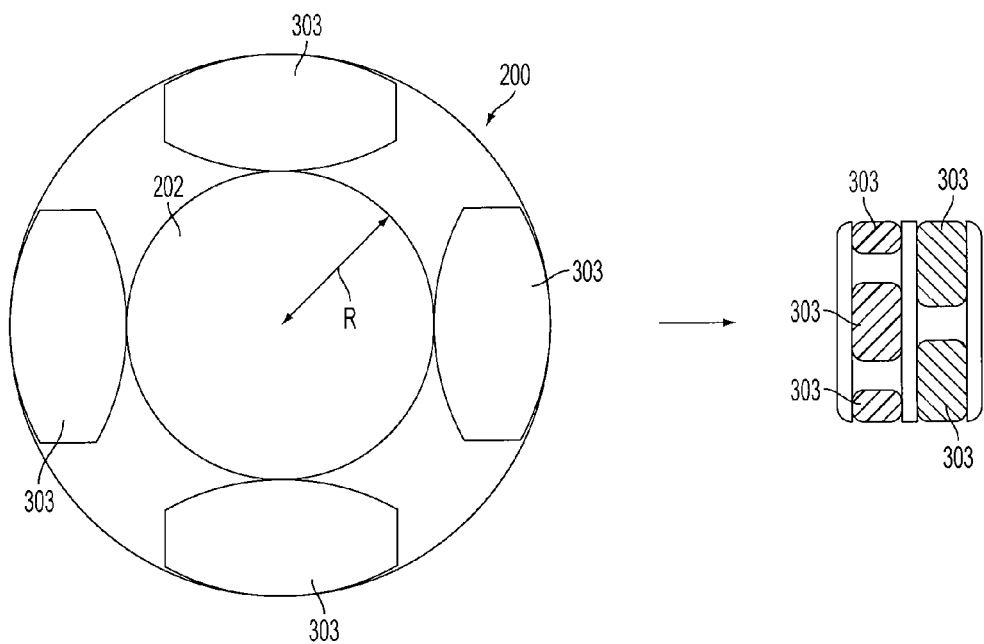
Figure 3C:
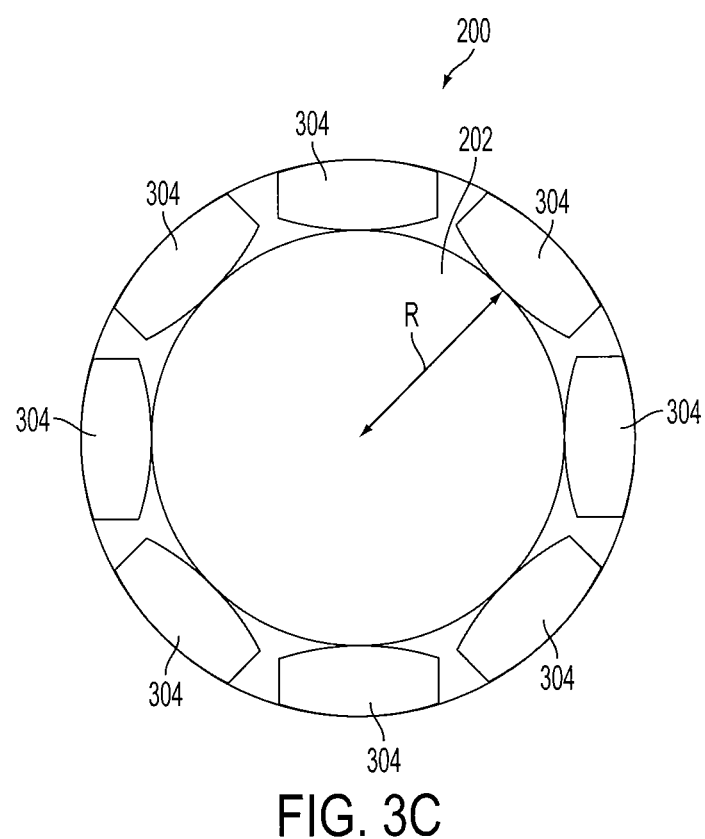

Although FIG. 2 shows that the OTWS 200 has twelve PWAs 210, the OTWS 200 may also have different numbers of PWAs according to various embodiments of the present invention. For example, FIG. 3A shows that the OTWS 200 may have three PWAs 302; FIG. 3B shows that the OTWS 200 may have four PWAs 303; and FIG. 3C shows that the OTWS 200 may have eight PWAs 304. To facilitate smoother rotation of the main wheel, an extra set of peripheral assemblies may be added. For example, as shown in the diagram 312, an extra set of three extra PWAs 302 is added to the OTWS 200 according to an embodiment of the present invention. For another example, as shown in the diagram 313, an extra set of four extra PWAs 303 is added to the OTWS 200 according to another embodiment of the present invention.

Figure 4A:
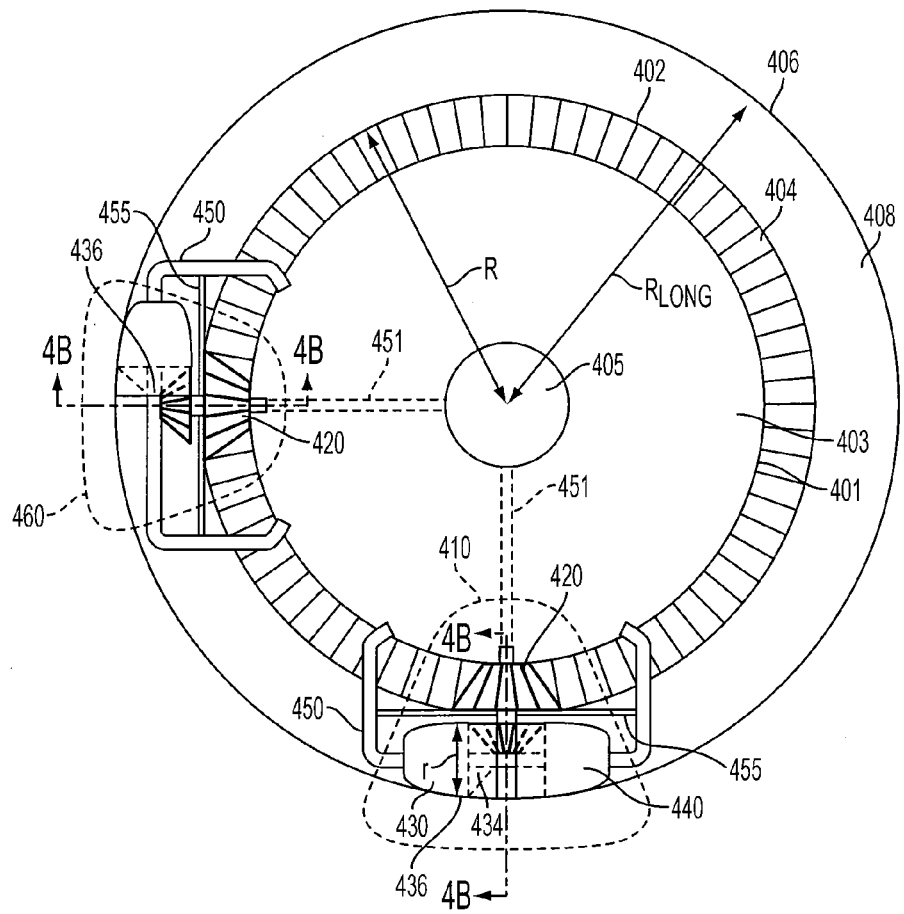
FIG. 4A shows a cross-sectional side view of the OTWS according to an embodiment of the present invention.

The discussion now turns to the internal structure of the OTWS 200. In FIG. 4A, which shows a cross-sectional side view of the OTWS 200, only one longitudinal gear 402 is displayed for the sake of clarity. According to an embodiment of the present invention, the OTWS 200 may have a spacing member 401 disposed between the two longitudinal gears 402. In general, the spacing member 401 may have a central axle 405 and two parallel discs 403, such that the central axle 405 is perpendicular to the two parallel discs 403.

The spacing member 401 may be operatively coupled to the two longitudinal gears 402 to help provide structural support for the OTWS 200. On one hand, the two parallel discs 403, along with the central axle 405, hold the two longitudinal gears 402 in place by preventing any substantial displacement between the two longitudinal gears 402. On the other hand, the parallel discs 403 allow the longitudinal gears 402 to freely rotate about the central axle 405. More specifically, the two longitudinal gears 402 may be rotated independently without interfering each other even though they are both operatively coupled to the spacing member 401. As such, the angular velocity of one longitudinal gear 402 should not affect the angular velocity of the other longitudinal gear 402 according to an embodiment of the present invention.

Although the spacing member 401 provides structural support to the longitudinal gears 402, it may or may not rotate along with the longitudinal gears 402. For example, if the spacing member 401 is coupled a rotary device (not shown) that rotates the longitudinal gears 402, it is likely that the spacing member 401 will remain angularly stationary in relative to the two longitudinal gears 402; otherwise, the spacing member 401 may rotate along with the longitudinal gears 402.

Referring to FIG. 4A, the OTWS 200 may have several PWAs distributed around the longitudinal gear 402. For the sake of simplicity, FIG. 4A only displays the PWAs 410 and 460. However, it is understood that the OTWS 200 may include more than two PWAs according to various embodiments of the present invention. In general, each PWA may have a connecting gear 420 and a wheel member, which may include a first wheel 430 and an optional second wheel 440. For example, the PWA 410 and the PWA 460 are structurally similar to each other except that the wheel member of the PWA 410 has the first wheel 430 and the optional second wheel 440, whereas the wheel member of the PWA 460 only has the first wheel 430. In practice, the OTWS 200 may adopt either the PWA 410 or the PWA 460, or the OTWS 200 may adopt both the PWAs 410 and 460.

Figure 4B:
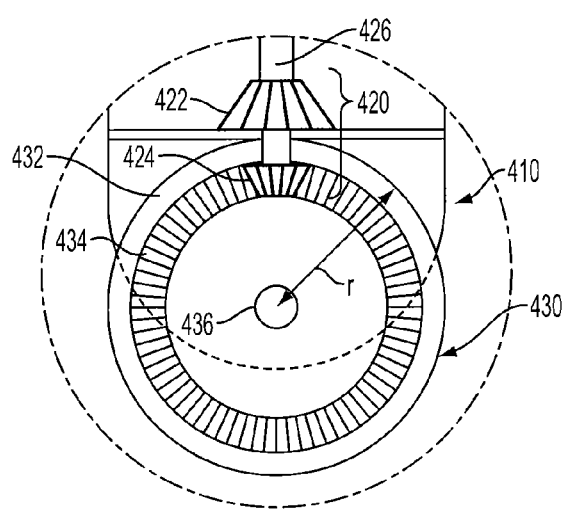
FIG. 4B shows a cross-sectional view of the PWA according to an embodiment of the present invention.

Referring to FIG. 4B, which shows a cross-sectional view of the PWAs 410 and 460, the first wheel 430 may have a circumference 432 defined by a radius r. The first wheel 430 may engage the connecting gear 420 via a receiving gear 434 such that the first wheel 430 may be rotated about the peripheral axle 436 when the connecting gear 420 is rotating.

The connecting gear 420 of each PWA 410 or 460 may have a distal end 422 and a proximal end 424. The distal end 422 should be engaged by and sandwiched between the two longitudinal gears 402 along their circumferential regions 404, and the proximal end 424 should engage the first wheel 430 via the receiving gear 434 of the first wheel 430. As such, the connecting gear 420 may serve two functions from a high level inventive standpoint. First, the connecting gear 420 may transmit the differential angular velocity between the two longitudinal gears 402 to the respective first wheel 430, thereby causing the respective first wheel 430 to rotate orthogonally in relative to the rotations of the longitudinal gears 402. Second, the connecting gear 420 may revolve around the central axle 405 by receiving the common angular velocity of the two longitudinal gears 402, such that the entire PWA 410 and 460 may also revolve around the central axle 405.

According to embodiment of the present invention, the distal end 422 may be coupled to the proximal end 424 via a radial axle 426, which is substantially parallel to the common radius R of the two longitudinal gears 402. The radial axle 426 may have an extended section 451 for coupling the entire PWA 410 or 460 to the central axle 405 of the spacing member 401. Alternatively, the PWA 410 or 460 may be coupled to the spacing member 401 or a pair of protective plates 408 via a brace member 450. The brace member 450 may have a stabilizer 455 for stabilizing the position of the radial axle 426 to ensure that the receiving gear 434 is properly engaged to the proximal end 424 of the connecting gear 420.

Referring again to FIG. 4A, the OTWS 200 may have protecting plates 406 for protecting the rotary device, the longitudinal gears 402, and the PWAs 410 and 460. Particularly, the protecting plates 406 may have an outer region 408 for protecting the PWAs 410 and 460. According to an embodiment of the present invention, the protecting plates 406 may be coupled to the spacing member 401 via the central axle 405, which penetrates the centers of the two longitudinal gears 402. Alternatively, the protecting plates 406 may be coupled to the two longitudinal gears 402 according to another embodiment of the present invention.

Figure 5:
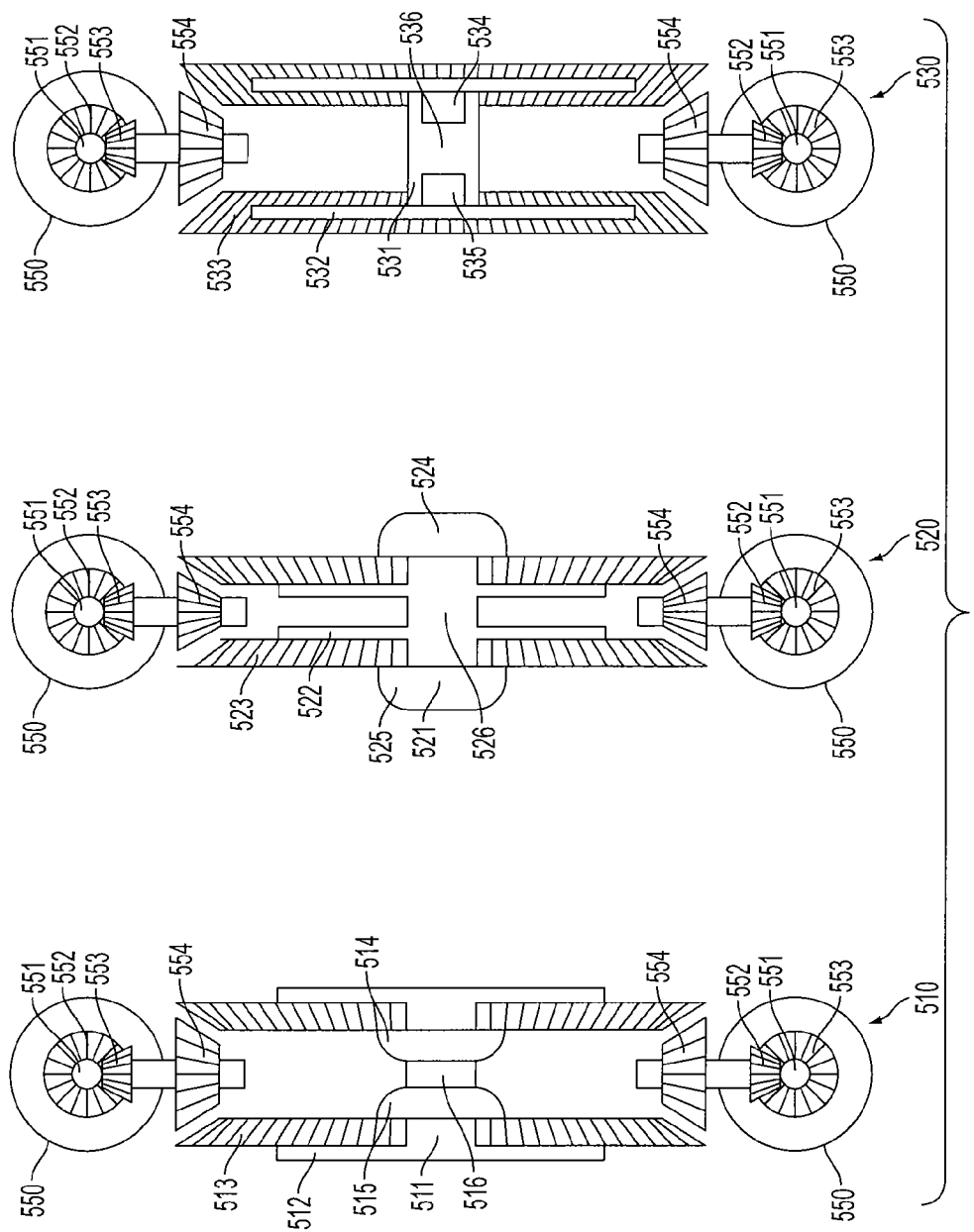
FIG. 5 shows the cross-sectional front views of the OTWS having several gear configurations according to various embodiments of the present invention.

Although FIG. 4A shows only one gear configuration of the OTWS 200, the OTWS 200 may have other gear configurations according to various embodiment of the present inventions. For example, FIG. 5 shows the cross-sectional front views of the OTWS 200 having several gear configurations 510, 520, and 530. For the sake of simplicity, only a top and a bottom PWAs 550 are displayed in each gear configuration. However, it is understood that several more PWAs may be included in each gear configuration and that the PWAs 550 are similar to the PWAs 410 and 460 discussed with respect to FIGS. 4A and 4B. More specifically, the PWA 550 may include the first wheel with the receiving gear 553 and the peripheral axle 551 as well as the connecting gear with the distal end 554 and the proximal end 552.

According to an embodiment of the present invention, the gear configuration 510 may adopt a pair of external gears 513 as the longitudinal gears 402. The external gears 513 may have a set of straight-cut teeth, helical teeth, or double helical teeth. The distal end 554 of the connecting gear may be a bevel gear with a set of teeth matching the external gears 513. Similarly, the proximal end 552 of the connecting gear may be a bevel gear with a set of teeth matching the receiving gear 553, which can be a spur gear, a helical gear, or a double helical gear.

The gear configuration 510 may also include the spacing member 511 and two rotary devices 514 and 515. The spacing member 511 may have a pair of discs 512 that secure the external gears 513 from the outside and a central axle 516 that penetrates the external gears 513 through their centers. The rotary devices 514 and 515 may be coupled to the central axle 516, such that the rotary devices 514 and 515 can separately and individually rotate each external gear 513 about the central axle 516. Although the gear configuration 510 adopts two rotary devices, one rotary device may be sufficient if it can separately and individually rotate each external gear 513.

According to another embodiment of the present invention, the gear configuration 520 may adopt a pair of external gears 523 as the longitudinal gears 402. The external gears 523 may have a set of straight-cut teeth, helical teeth, or double helical teeth. The distal end 554 of the connecting gear may be a bevel gear with a set of teeth matching the external gears 523. Similarly, the proximal end 552 of the connecting gear may be a bevel gear with a set of teeth matching the receiving gear 553, which can be a spur gear, a helical gear, or a double helical gear.

The gear configuration 520 may also include the spacing member 521 and two rotary devices 524 and 525. The spacing member 521 may have a pair of discs 522 that secure the external gears 523 from the inside and a central axle 526 that penetrates the external gears 523 through their centers. The rotary devices 524 and 525 may be coupled to both ends of the central axle 526, such that the rotary devices 524 and 525 can separately and individually rotate each external gear 523 about the central axle 526. Although the gear configuration 520 adopts two rotary devices, one rotary device may be sufficient if it can separately and individually rotate each external gear 523.

According to yet another embodiment of the present invention, the gear configuration 530 may adopt a pair of modified external gears 533 as the longitudinal gears 402. The modified external gears 533 may have a set of straight-cut teeth, helical teeth, or double helical teeth. The distal end 554 of the connecting gear may be a bevel gear with a set of teeth matching the modified external gears 533. Similarly, the proximal end 552 of the connecting gear may be a bevel gear with a set of teeth matching the receiving gear 553, which can be a spur gear, a helical gear, or a double helical gear.

The gear configuration 530 may also include the spacing member 531 and two rotary devices 534 and 535. The spacing member 531 may have a pair of internal discs 532 embedded in the middle of the modified external gears 533 and a central axle 536 coupled between the internal discs 532. The rotary devices 534 and 535 may be disposed within the central axle 536 for separately and individually rotating the pair of internal discs 532. Accordingly, the pair of modified external gears 533 may be rotated separately and individually because they are coupled to the internal discs 532. Although the gear configuration 530 adopts two rotary devices, one rotary device may be sufficient if it can separately and individually rotate each modified external gear 533.

It is understood that the components of each gear configurations may be interchangeable. In an embodiment of the present invention, the spacing member 511 may be used in the gear configuration 520. In another embodiment of the present invention, the central axle 536 with the embedded rotary devices 534 and 535 may be used in the gear configuration 510. In yet another embodiment of the present invention, the external gears 523 may be used in the gear configuration 530.

Figure 6:
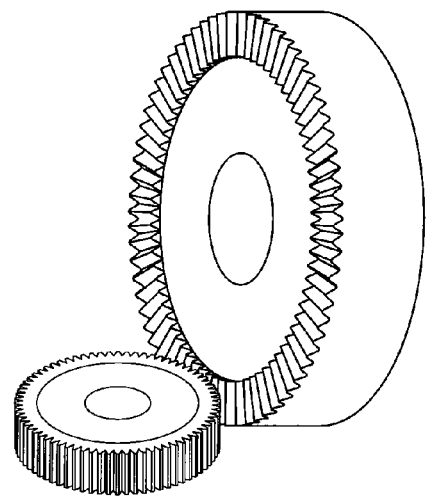
FIG. 6 shows the exemplary models of an external gear and a bevel gear according to various embodiments of the present invention.
Figure 6:
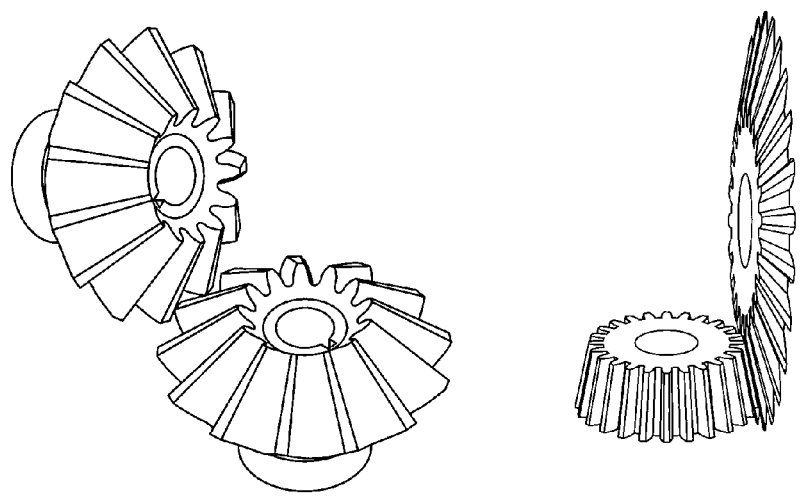
Figure 6:
Figure 7:
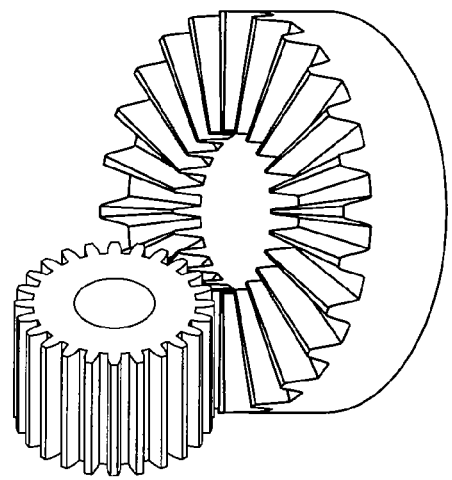
FIG. 7 shows the exemplary models of a spear gear, a helical gear, and a double helical gear according to various embodiments of the present invention.
Figure 7:
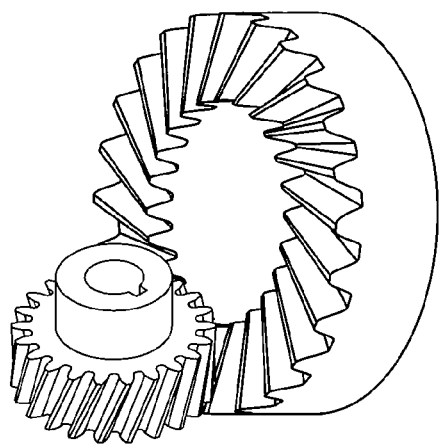
Figure 7:
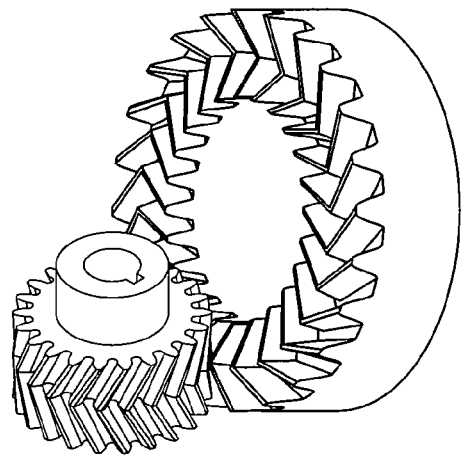

For illustrative purposes, FIGS. 6 and 7 are provided to show the exemplary models of the several gears discussed herein. For example, FIG. 6 shows the exemplary models of the external gear and the bevel gear. For another example, FIG. 7 shows the exemplary models of the spur gear, the helical gear, and the double helical gear. It is understood that the longitudinal gears, the connecting gears, and the receiving gears may take other alternative forms, as long as their combinations are consistent with the general principles of mechanics.

The discussion now turns to the physics of the OTWS. In FIG. 8A, which shows the high level conceptual view of the OTWS according to an embodiment of the present invention, the pair of longitudinal gears may be represented by a left gear (or interchangeably a first gear) 802 and a right gear (interchangeably a second gear) 804. Although the terms "left" and "right" are used consistently throughout the rest of the specification, it is to be emphasized that they are interchangeable and are relatively defined such that they should not be construed in the absolute sense.

The left gear 802 and the right gear 804 are parallel to a first plane Sx and orthogonal to a first axis (interchangeably a longitudinal axis) Ax. The left and right angular velocities $V_{XL}$ and $V_{XR}$ represent the angular velocities of the left and right gears 802 and 804 respectively. Both the left and right angular velocities $V_{XL}$ and $V_{XR}$ are measured in the clockwise direction about the first axis Ax in radian per second. When the left and right angular velocities $V_{XL}$ and $V_{XR}$ are positive, meaning that the left and right gears 802 and 804 are rotating in the clockwise direction, the OTWS 800 travels forward with a positive longitudinal velocity $V_{LONG}$. When the left and right angular velocities $V_{XL}$ and $V_{XR}$ are negative, meaning that the left and right gears 802 and 804 are rotating in the counterclockwise direction, the OTWS 800 travels backward with a negative longitudinal velocity $V_{LONG}$.

As defined herein, the term "longitudinal" is associated with the forward and backward directions, whereas the term "lateral" is associated with the left and right directions. Although the terms "forward" and "backward" are used consistently throughout the rest of the specification, it is to be emphasized that they are interchangeable and are relatively defined such that they should not be construed in the absolute sense.

The left and right gears 802 and 804 define a cylindrical space 806 in between them and the cylindrical space 806 has a circumferential region 808. According to an embodiment of the present invention, the distal end 822 of the connecting gear 820 of each PWA 810 may be distributed along the circumferential region 808, such that the connecting gear 820 may be rotated about a radial axis Ay, which is substantially parallel to a radius of the cylindrical space 806. As such, the radial axis Ay of each PWA 810 should be substantially orthogonal to the first axis Ax and the radial plane Sy of each PWA 810 should be substantially parallel to the side surface of the cylindrical space 806.

In an embodiment of the present invention, the distal end 822 of the connecting gear 820 is engaged between both left and right gears 802 and 804. As such, the angular velocity Vy of the connecting gear 820 is a function of a differential angular velocity $V_{diff}$ between the left and right gears 802 and 804. More specifically, the differential angular velocity $V_{diff}$ is defined as $V_{XL}$-$V_{XR}$. For example, if Kxy represents the gear ratio between the longitudinal gear 802 and the connecting gear 820, the angular velocity Vy equals Kxy*($V_{diff}$).

Under this differential mechanism, the connecting gear 820 may (1) rotate clockwise about the radial axis Ay at a positive angular velocity Vy when the left angular velocity $V_{XL}$, is greater than right angular velocity $V_{XR}$ (i.e., the differential angular velocity $V_{diff}$ is greater than 0); (2) rotate counterclockwise about the radial axis Ay at a negative angular velocity Vy when the left angular velocity $V_{XL}$ is less than the right angular velocity $V_{XR}$ (i.e., the differential angular velocity $V_{diff}$ is less than 0); and (3) remain angularly stationary (i.e., no rotation) when the left angular velocity $V_{XL}$ is substantially the same as the right angular velocity $V_{XR}$ (i.e., the left and right angular velocities $V_{XL}$ and $V_{XR}$ are in the same direction and of the same magnitude).

Referring to FIG. 8A, the PWA 810 is symmetrical along a plane that is parallel to the first plane Sx and positioned in the middle of the cylindrical space 806. The receiving gear 830 of the first wheel is engaged by the proximal end 824 of the connecting gear 820, such that the first wheel may be rotated about a second axis (interchangeably a peripheral axis) Az when the connecting gear 820 rotates. Because the proximal end 824 has the same angular velocity as the distal end 822, the angular velocity Vz of the first wheel is a function of the angular velocity Vy of the distal end 822, which ultimately depends on the differential angular velocity $V_{diff}$ between the left and right angular velocities $V_{XL}$ and $V_{XR}$. More specifically, if Kyz represents the gear ratio between the connecting gear 820 and the receiving gear 830, the angular velocity Vz equals Kyz*Vy, which ultimately equals Kyz*Kxy*($V_{diff}$).

According to an embodiment of the present invention, the left and right angular velocities $V_{XL}$ and $V_{XR}$ may be ranged from about 0 radian per second to about plus or minus 20 radians per second. More specifically, the left and right angular velocities $V_{XL}$ and $V_{XR}$ may be about plus or minus 8 radians per second. According to an embodiment of the present invention, the radius of the longitudinal gears 802 and 804 may be about 8 cm, the radius of the connecting gear 420 may be about 0.5 cm, and the radius of the receiving gear 830 may be about 2.5 cm. As such, the gear ratio gear ratio Kxy may be about 16 and the gear ratio Kyz may be about 0.2.

For example, the first wheel may (1) rotate clockwise about the second axis Az at a positive angular velocity Vz when the left angular velocity $V_{XL}$ is greater than the right angular velocity $V_{XR}$ (i.e., the differential angular velocity $V_{diff}$ is greater than 0); (2) rotate counterclockwise about the radial axis Az at a negative angular velocity Vz when the left angular velocity $V_{XL}$ is less than the right angular velocity $V_{XR}$ (i.e., the differential angular velocity $V_{diff}$ is less than 0); and (3) remain angularly stationary when the left angular velocity $V_{XL}$ is substantially the same as the right angular velocity $V_{XR}$. For the sake of clarity, FIG. 8B summarizes the rotating directions of the angular velocities Vy and Vz when the left angular velocity $V_{XL}$ is less than the right angular velocity $V_{XR}$ (i.e., the differential angular velocity $V_{diff}$<0); and FIG. 8C summarizes the rotating directions of the angular velocities Vy and Vz when the left angular velocity $V_{XL}$ is greater than the right angular velocity $V_{XR}$ (i.e., the differential angular velocity $V_{diff}$>0).

When the first wheel rotates at a positive angular velocity Vz, the OTWS 800 may travel laterally to the left at a positive lateral velocity $V_{LAT}$, which equals Vz*r. Conversely, when the first wheel, rotates at a negative angular velocity Vz, the OTWS 800 may travel laterally to the right at a negative lateral velocity $V_{LAT}$, which equals Vz*r. Moreover, if the left angular velocity $V_{XL}$ does not substantially cancel out the right angular velocity $V_{XR}$, the entire PWA 810 may revolve around the first axis Ax by travelling along the circumferential region 808 at a common angular velocity $V_{com}$.

Figure 9:
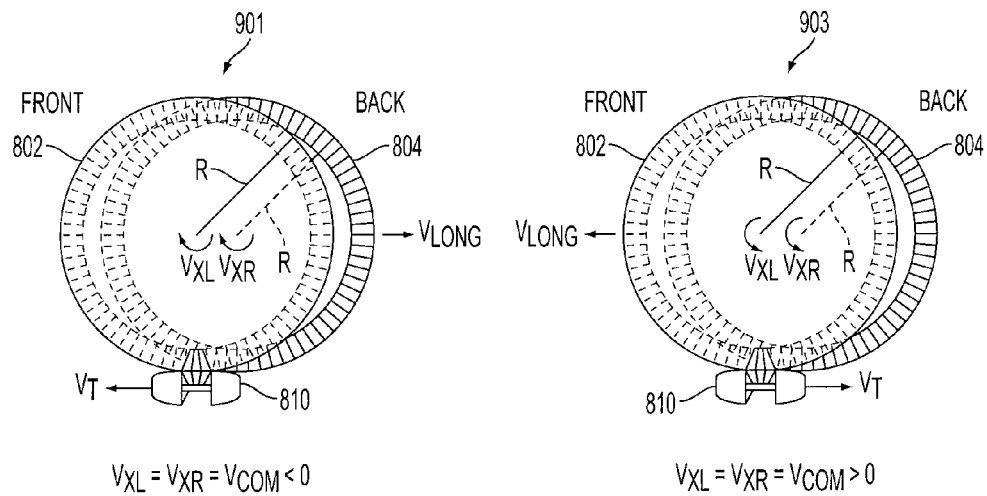
FIG. 9 shows a common mode operation of the OTWS according to an embodiment of the present invention.
Figure 9:
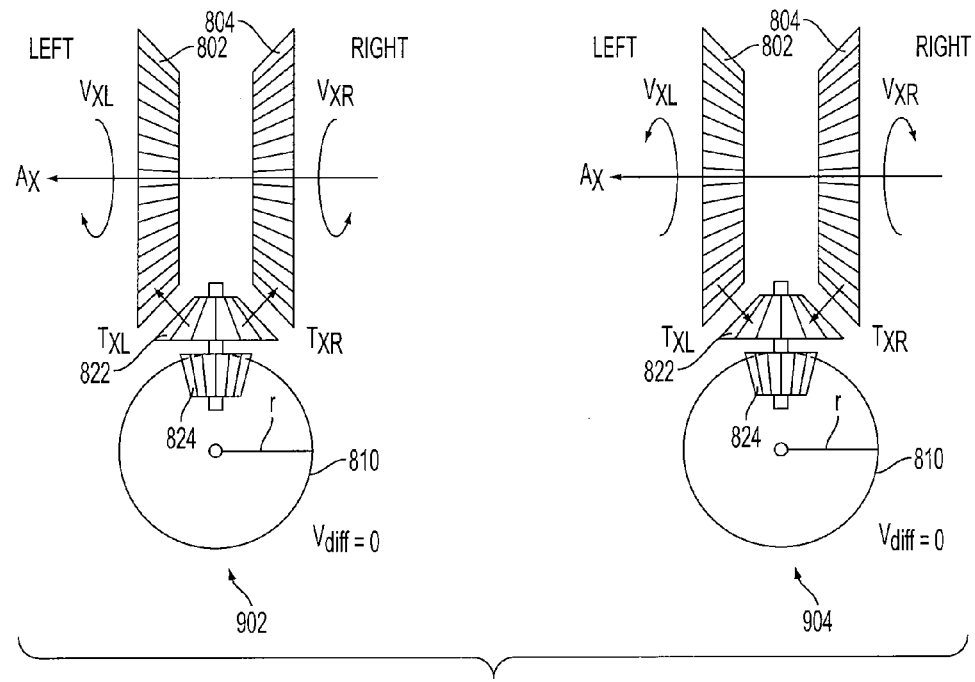

The discussion now turns to several operation modes of the OTWS. FIG. 9 demonstrates a common mode operation of the OTWS 800 according to an embodiment of the present invention. Under the common mode operation, the left and right gears 802 and 804 always rotate at a common angular velocity $V_{com}$, meaning that the left gear 802 has the same angular speed and the same rotating direction as the right gear 802. As shown in the diagrams 901 and 903, both the left and right gears 802 and 804 may rotate clockwise or counterclockwise at the same time with the same angular speed.

Consequentially, the PWA 810 may revolve around the first axis Ax at the common angular velocity $V_{com}$. For example, the PWA 810 in the diagram 901 may revolve around the first axis Ax at a negative common angular velocity $V_{com}$, which is less than 0. Accordingly, the OTWS 800 may travel backward at a negative longitudinal velocity $V_{LONG}$. For another example, the PWA 810 in the diagram 901 may revolve around the first axis Ax at a positive common angular velocity $V_{com}$, which is greater than 0. Accordingly, the OTWS 800 may travel forward at a positive longitudinal velocity $V_{LONG}$.

Referring to the diagram 902, which shows the cross-sectional back view of the diagram 901, the left angular velocity $V_{XL}$ produces a left thrust $T_{XL}$ directing the distal end 822 of the connecting gear 820 to rotate counterclockwise about the radial axis Ay, whereas the right angular velocity $V_{XR}$ produces a right thrust $T_{XR}$ directing the distal end 822 of the connecting gear 820 to rotate clockwise about the radial axis Ay. However, because the left angular velocity $V_{XL}$ substantially equals the right angular velocity $V_{XR}$, the left thrust $T_{XL}$ substantially cancels out the right thrust $T_{XR}$ such that the distal end 822 of the connecting gear 820 remains angularly stationary.

Similarly, in diagram 904, which shows the cross-sectional back view of the diagram 903, the left angular velocity $V_{XL}$ produces a left thrust $T_{XL}$ directing the distal end 822 of the connecting gear 820 to rotate clockwise about the radial axis Ay, whereas the right angular velocity $V_{XR}$ produces a right thrust $T_{XR}$ directing the distal end 822 of the connecting gear 820 to rotate counterclockwise about the radial axis Ay. Again, because the left angular velocity $V_{XL}$, substantially equals the right angular velocity $V_{XR}$, the left thrust $T_{XL}$, substantially cancels out the right thrust $T_{XR}$ such that the distal end 822 of the connecting gear 820 remains angularly stationary.

Figure 10:
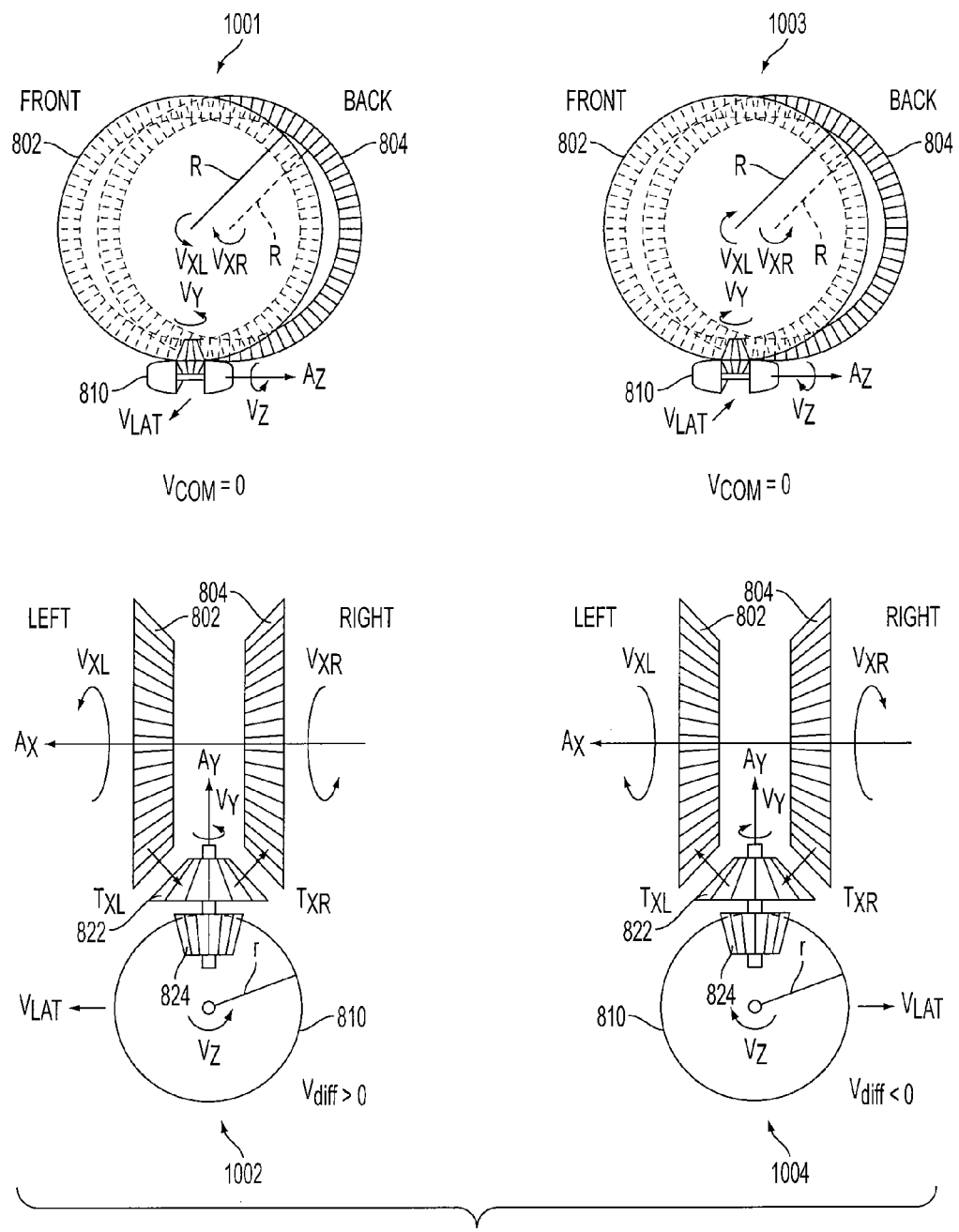
FIG. 10 shows a differential mode operation of the OTWS according to an embodiment of the present invention.

FIG. 10 demonstrates a differential mode operation of the OTWS 800 according to another embodiment of the present invention. Under the differential mode operation, the left and right gears 802 and 804 always rotate at a pair of opposite angular velocities, meaning that the left gear 802 has the same angular speed but the opposite rotating direction as the right gear 802. As shown in the diagrams 1001 and 1003, the left and right gears 802 and 804 may rotate at a pair of opposite directions at the same time with the same angular speed. Because the left angular velocity $V_{XL}$ substantially cancels out the right angular velocity $V_{XR}$, the PWA 810 will not revolve around the first axis Ax, such that the OTWS 800 will not travel longitudinally.

Referring to the diagram 1002, which shows the cross-sectional back view of the diagram 1001, the left angular velocity $V_{XL}$, produces a left thrust $T_{XL}$, directing the distal end 822 of the connecting gear 820 to rotate clockwise about the radial axis Ay, and the right angular velocity $V_{XR}$ also produces a right thrust $T_{XR}$ directing the distal end 822 of the connecting gear 820 to rotate clockwise about the radial axis Ay. Consequentially, the connecting gear 820 directs the receiving gear 830 of the first wheel to rotate about the second axis Az at the angular velocity Vz. Because the first wheel rotates clockwise, the OTWS 800 may travel laterally to the left at a positive lateral velocity $V_{LAT}$.

Similarly, in diagram 1004, which shows the cross-sectional front view of the diagram 1003, the left angular velocity $V_{XL}$ produces a left thrust $T_{XL}$ directing the distal end 822 of the connecting gear 820 to rotate counterclockwise about the radial axis Ay, and the right angular velocity $V_{XR}$ produces a right thrust $T_{XR}$ also directing the distal end 822 of the connecting gear 820 to rotate counterclockwise about the radial axis Ay. Consequentially, the connecting gear 820 directs the receiving gear 830 of the first wheel to rotate about the second axis Az at the angular velocity Vz. Because the first wheel rotates counterclockwise, the OTWS 800 may travel laterally to the right at a negative lateral velocity $V_{LAT}$.

Figure 11:
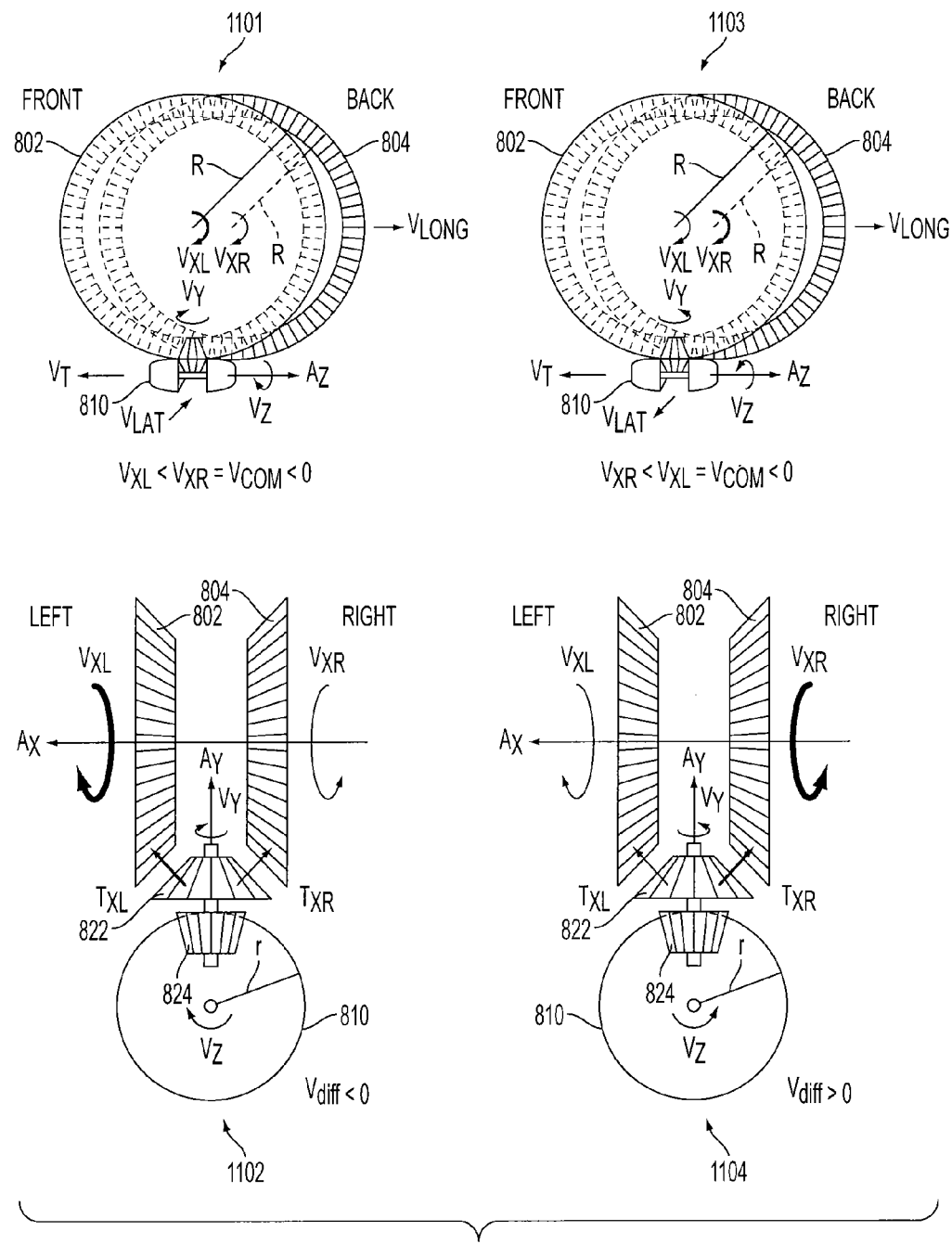
FIG. 11 shows a forward differential mode operation of the OTWS according to an embodiment of the present invention.

FIG. 11 demonstrates a backward differential mode operation of the OTWS 800 according to yet another embodiment of the present invention. In one embodiment, under the backward differential mode operation, the angular velocity $V_{XL}$ should be substantially different from the right angular velocity $V_{XR}$ and the common angular velocity $V_{com}$ of the left and right gears 802 and 804 will always be negative and in the counterclockwise direction about the first axis Ax. For example, as shown in the diagram 1101, both the left and right gears 802 and 804 are rotating counterclockwise about the first axis Ax, but the magnitude of the left angular velocity $V_{XL}$ is substantially greater than the magnitude of the right angular velocity $V_{XR}$. Accordingly, the common angular velocity $V_{com}$ is substantially the same as $V_{XR}$. For another example, as shown in the diagram 1103, both the left and right gears 802 and 804 are rotating counterclockwise about the first axis Ax, but the magnitude of the left angular velocity $V_{XL}$ is substantially smaller than the magnitude of the right angular velocity $V_{XR}$. Accordingly, the common angular velocity $V_{com}$ is substantially the same as $V_{XL}$.

In any event, the longitudinal gear with the dominant angular velocity (i.e., the left angular velocity $V_{XL}$ in the diagram 1101 and the right angular velocity $V_{XR}$ in the diagram 1103) should be rotating counterclockwise, such that the PWA 810 may revolve counterclockwise around the first axis Ax regardless of the rotating direction of the other longitudinal gear. That is, the right gear 804 in the diagram 1101 may rotate clockwise as long as the magnitude of the right angular velocity $V_{XR}$ is less than the magnitude of the left angular velocity $V_{XL}$; and similarly, the left gear 802 in the diagram 1103 may rotate counterclockwise as long as the magnitude of the left angular velocity $V_{XL}$ is less than the magnitude of the right angular velocity $V_{XR}$.

Referring to the diagram 1102, which shows the cross-sectional back view of the diagram 1101, the left angular velocity $V_{XL}$ produces a left thrust $T_{XL}$ directing the distal end 822 of the connecting gear 820 to rotate counterclockwise about the radial axis Ay whereas the right angular velocity $V_{XR}$ produces a right thrust $T_{XR}$ directing the distal end 822 of the connecting gear 820 to rotate clockwise about the radial axis Ay. Because the left thrust $T_{XL}$ is stronger than the right thrust $T_{XR}$, the left thrust $T_{XL}$ overcomes the left thrust $T_{XR}$ and thereby causing the distal end 822 of the connecting gear 820 to rotate counterclockwise. Consequentially, the connecting gear 820 directs the receiving gear 830 of the first wheel to rotate counterclockwise about the second axis Az at the angular velocity Vz, such that the OTWS 800 may travel laterally to the right at a negative lateral velocity $V_{LAT}$. Driven simultaneously by the longitudinal velocity $V_{LONG}$ and the lateral velocity $V_{LAT}$, the OTWS 800 may travel diagonally in the back-right direction.

Similarly, in the diagram 1104, which shows the cross-sectional back view of the diagram 1103, the left angular velocity $V_{XL}$ produces a left thrust $T_{XL}$ directing the distal end 822 of the connecting gear 820 to rotate counterclockwise about the radial axis Ay, whereas the right angular velocity $V_{XR}$ produces a right thrust $T_{XR}$ directing the distal end 822 of the connecting gear 820 to rotate clockwise about the radial axis Ay. Because the left thrust $T_{XL}$ is weaker than the right thrust $T_{XR}$, the left thrust $T_{XL}$ gives way to the right thrust $T_{XR}$ and thereby causing the distal end 822 of the connecting gear 820 to rotate clockwise. Consequentially, the connecting gear 820 directs the receiving gear 830 of the first wheel to rotate clockwise about the second axis Az at the angular velocity Vz, such that the OTWS 800 may travel laterally to the left at a positive lateral velocity $V_{LAT}$. Driven simultaneously by the longitudinal velocity $V_{LONG}$ and the lateral velocity $V_{LAT}$, the OTWS 800 may travel diagonally in the back-left direction.

Figure 12:
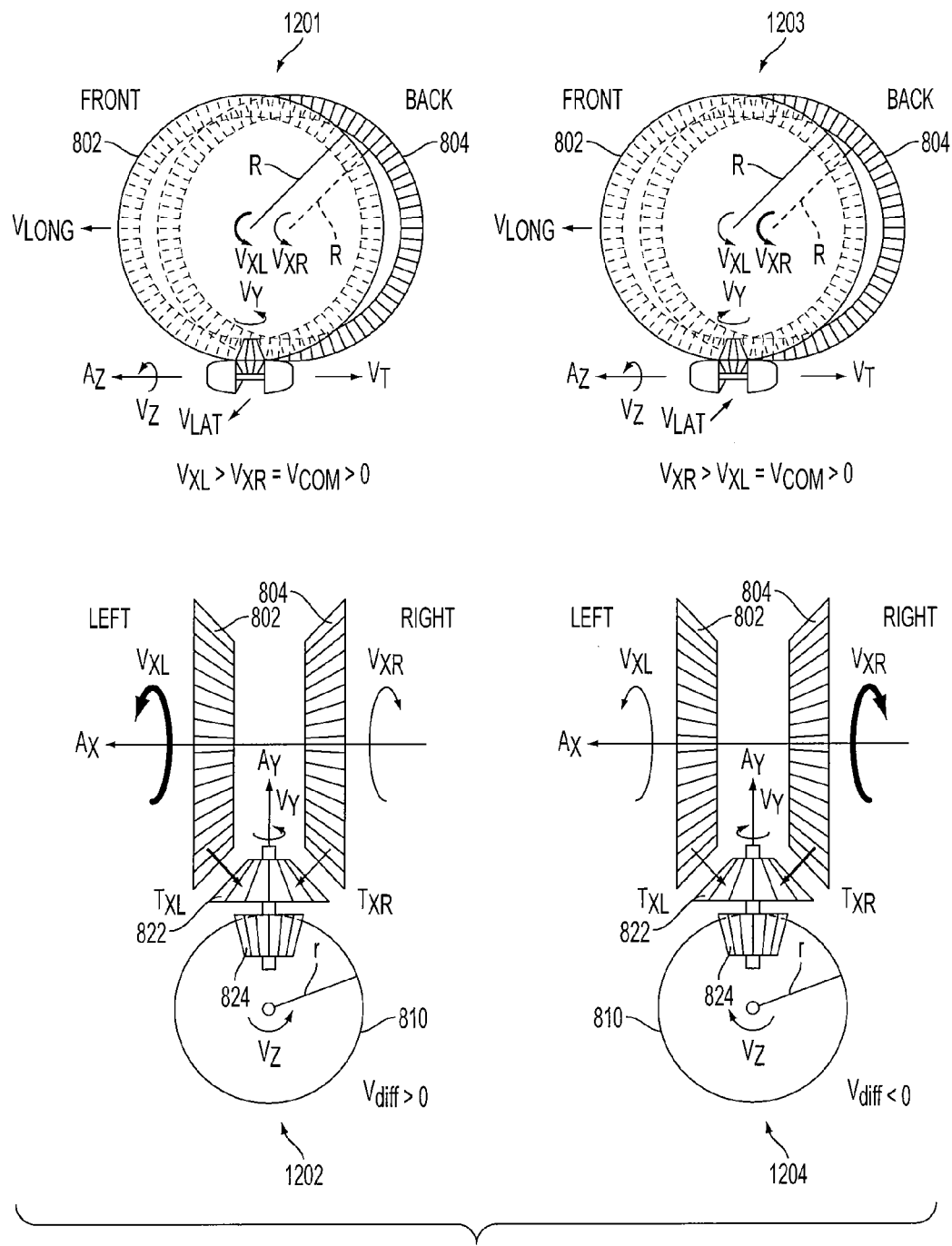
FIG. 12 shows a backward differential mode operation of the OTWS according to an embodiment of the present invention.

FIG. 12 demonstrates a forward differential mode operation of the OTWS 800 according to yet another embodiment of the present invention. Under the forward differential mode operation, the left angular velocity $V_{XL}$ should be substantially different from the right angular velocity $V_{XR}$ and the common angular velocity $V_{com}$ of the left and right gears 802 and 804 will always be positive and in the clockwise direction about the first axis Ax. For example, as shown in the diagram 1201, both the left and right gears 802 and 804 are rotating clockwise about the first axis Ax, but the magnitude of the left angular velocity $V_{XL}$ is substantially greater than the magnitude of the right angular velocity $V_{XR}$. Accordingly, the common angular velocity $V_{com}$ is substantially the same as $V_{XR}$. For another example, as shown in the diagram 1203, both the left and right gears 802 and 804 are rotating clockwise about the first axis Ax, but the magnitude of the left angular velocity $V_{XL}$ is substantially smaller than the magnitude of the right angular velocity $V_{XR}$. Accordingly, the common angular velocity $V_{com}$ is substantially the same as $V_{XL}$.

In any event, the longitudinal gear with the dominant angular velocity (i.e. the left angular velocity $V_{XL}$ in the diagram 1201 and the right angular velocity $V_{XR}$ in the diagram 1203) should be rotating clockwise, such that the PWA 810 may revolve clockwise around the first axis Ax regardless of the rotating direction of the other longitudinal gear. That is, the right gear 804 in the diagram 1201 may rotate counterclockwise as long as the magnitude of the right angular velocity $V_{XR}$ is less than the magnitude of the left angular velocity $V_{XL}$; and similarly, the left gear 802 in the diagram 1203 may rotate counterclockwise as long as the magnitude of the left angular velocity $V_{XL}$, is less than the magnitude of the right angular velocity $V_{XR}$.

Referring to the diagram 1202, which shows the cross-sectional back view of the diagram 1201, the left angular velocity $V_{XL}$, produces a left thrust $T_{XL}$ directing the distal end 822 of the connecting gear 820 to rotate clockwise about the radial axis Ay, whereas the right angular velocity $V_{XR}$ produces a right thrust $T_{XR}$ directing the distal end 822 of the connecting gear 820 to rotate counterclockwise about the radial axis Ay. Because the left thrust $T_{XR}$, is stronger than the right thrust $T_{XR}$, the left thrust $T_{XL}$ overcomes the left thrust $T_{XR}$ and thereby causing the distal end 822 of the connecting gear 820 to rotate clockwise. Consequentially, the connecting gear 820 directs the receiving gear 830 of the first wheel to rotate clockwise about the second axis Az at the angular velocity Vz, such that the OTWS 800 may travel laterally to the left at a positive lateral velocity $V_{LAT}$. Driven simultaneously by the longitudinal velocity $V_{LONG}$ and the lateral velocity $V_{LAT}$, the OTWS 800 may travel diagonally in the front-left direction.

Similarly, in the diagram 1204, which shows the cross-sectional back view of the diagram 1203, the left angular velocity $V_{XL}$, produces a left thrust $T_{XL}$ directing the distal end 822 of the connecting gear 820 to rotate clockwise about the radial axis Ay, whereas the right angular velocity $V_{XR}$ produces a right thrust $T_{XR}$ directing the distal end 822 of the connecting gear 820 to rotate counterclockwise about the radial axis Ay. Because the left thrust $T_{XL}$ is weaker than the right thrust $T_{XR}$, the left thrust $T_{XL}$ gives way to the left thrust $T_{XR}$ and thereby causing the distal end 822 of the connecting gear 820 to rotate counterclockwise. Consequentially, the connecting gear 820 directs the receiving gear 830 of the first wheel to rotate counterclockwise about the second axis Az at the angular velocity Vz, such that the OTWS 800 may travel laterally to the right at a negative lateral velocity $V_{LAT}$. Driven simultaneously by the longitudinal velocity $V_{LONG}$ and the lateral velocity $V_{LAT}$, the OTWS 800 may travel diagonally in the front-right direction.

Figure 13:
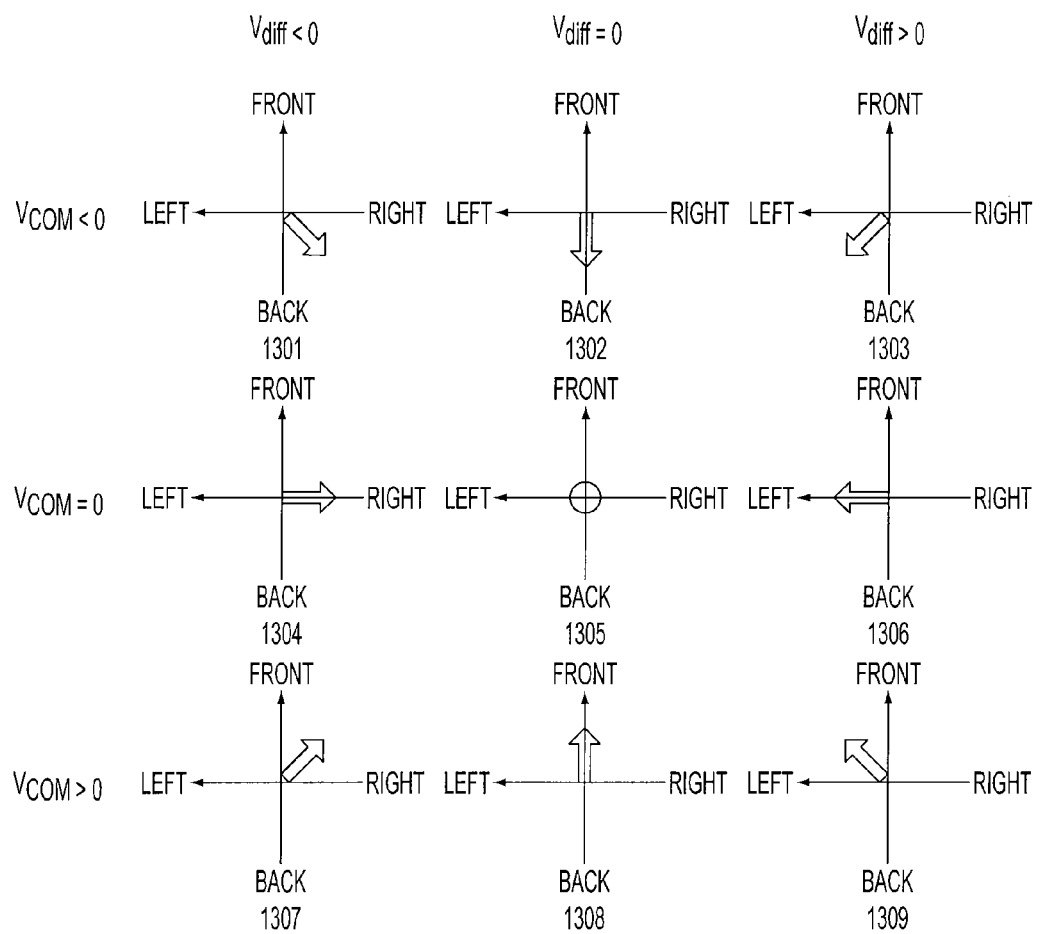
FIG. 13 shows all the traveling directions of the OTWS with respect to various combinations of the differential angular velocity and common angular velocity according to various embodiments of the present invention.

FIG. 13 provides a summary for all traveling directions of the OTWS 800 with respect to various combinations of the differential angular velocity $V_{diff}$ and the common angular velocity $V_{com}$. For example, the charts 1301 to 1303 represent the traveling directions of the OTWS 800 when $V_{com}$ is less than 0 (i.e. the backward mode). For another example, the charts 1304 to 1306 represent the traveling directions of the OTWS 800 when $V_{com}$ equals 0 (i.e. the pure differential mode). For yet another example, the charts 1307 to 1309 represent the traveling directions of the OTWS 800 when $V_{com}$ is greater than 0 (i.e. the forward mode).

Under the differential mechanism, the magnitude of the longitudinal velocity $V_{LONG}$ and the lateral velocity $V_{LAT}$ can be adjusted by varying the difference between the left and right angular velocities $V_{XL}$ and $V_{XR}$. In general, the magnitude of the lateral velocity $V_{LAT}$ increases proportionally with the differential angular velocity $V_{diff}$, whereas the longitudinal velocity $V_{LONG}$ increases proportionally with the common angular velocity $V_{com}$. According to an embodiment of the present invention, the magnitudes of the longitudinal velocity $V_{LONG}$ and the lateral velocity $V_{LAT}$ may be ranged from about 0 m/s to about plus or minus 10 m/s. More specifically, the magnitudes of the longitudinal velocity $V_{LONG}$ and the lateral velocity $V_{LAT}$ may be about plus or minus 2 m/s.

Figure 14:
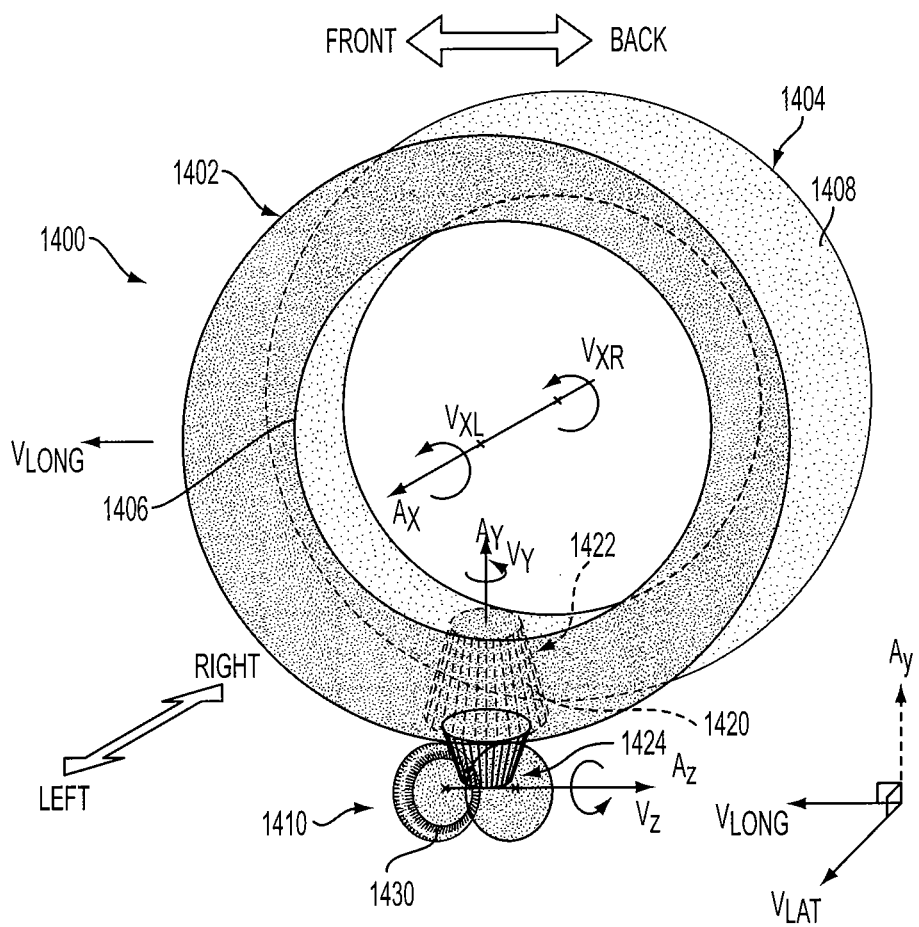
FIG. 14 shows a cross-sectional side view of the OTWS with frictional control according to an embodiment of the present invention.

Various embodiments of the present invention adopt a gear system in actuating the differential mechanism. However, the differential mechanism of the OTSW may be actuated by adopting a frictional system according to an alternative embodiment. For example, referring again to FIG. 8A, the pair of longitudinal gears 802 and 804 may be replaced by a pair of plates, each of which has a frictional surface facing against each other. As shown in FIG. 14, the pair of plates 1402 and 1404 may have the frictional surfaces 1406 and 1408 facing against each other. The frictional surfaces 1406 and 1408 may engage the PWAs 1410 via a connecting member 1420.

Similar to the connecting gear 820, the connecting member 1420 may be rotated about the radial axis Ay when the differential angular velocity $V_{diff}$ between the pair of plates is greater or less than zero. However, unlike the connecting gear 820, the connecting member 1420 does not have a teethed surface. Instead, the connecting member 1420 may have a frictional surface similar to the pair of plates 1402 and 1404.

The connecting member 1420 may have a distal end for engaging the frictional surfaces 1406 and 1408 of the pair of plates 1402 and 1404, and a proximal end for engaging the first wheel 1430, which also has a frictional surface similar to the pair of plates 1402 and 1404. As such, the PWA 1410 may rotates about the second axis Az when the differential angular velocity $V_{diff}$ between the pair of plates 1402 and 1404 is greater or less than zero.

Figure 15:
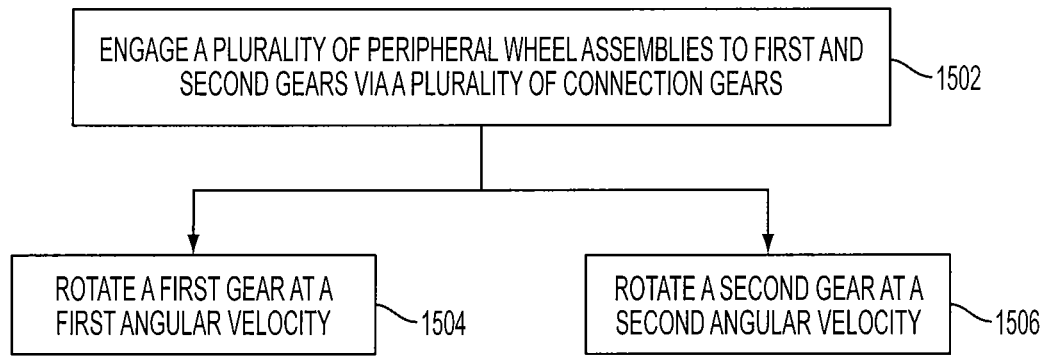
FIG. 15 shows a flow diagram showing the method steps for operating the omni traction wheel system according to an embodiment of the present invention.

FIG. 15 is a flow chart that illustrates the method steps of operating the omni traction wheel according to an embodiment of the present invention. These method steps are related to the discussion with respect to FIGS. 2 to 12. Although these steps might introduce terminologies different from those in the previous discussion, these steps are consistent with the spirit and concept of the previous discussion and should not be construed otherwise.

In step 1502, a plurality of peripheral wheels is engaged to first and second gears via a plurality of connection gears. In step 1504, the first gear is rotated at a first angular velocity. In step 1506, the second gear is rotated at a second angular velocity, wherein the omni traction wheel: (1) travels laterally when the first angular velocity is different from the second angular velocity such that each connecting gear is configured to rotate the respective peripheral wheel, (2) travels longitudinally when the first and second angular velocities are in a same direction such that each connecting gear, along with the respective peripheral wheel, is configured to revolve around a circular plate positioned between the first and second gears and substantially parallel to the first and second gears, (3) travels diagonally when the first angular velocity is different from the second angular velocity and when the first and second angular velocities are in a same direction, (4) remains laterally stationary when the first angular velocity substantially equals the second angular velocity, and (5) remains longitudinally stationary when the sum of the first and second angular velocities is substantially zero.

The previous description of the disclosed examples is provided to enable any person of ordinary skill in the art to make or use the disclosed methods or apparatus. Various modifications to these examples will be readily apparent to those skilled in the art, and the principles defined herein may be applied to other examples without departing from the spirit or scope of the disclosed method and apparatus. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. An omni traction wheel, comprising:
   first and second gears centrally aligned along a first axis;
   a plurality of peripheral wheel assemblies, each having:
      a wheel member centrally aligned along a second axis, the second axis orthogonal to the first axis, and
      a connecting gear having a distal end for engaging the first and second gears and a proximal end for engaging the wheel member, the distal end and the proximal end defining a radial axis, the radial axis parallel to a common radius of the first and second gears and orthogonal to the first axis and the second axis; and
   a rotary device for rotating the first gear about the first axis at a first angular velocity and for rotating the second gear about the first axis at a second angular velocity,
   whereby the connecting gear of each peripheral wheel assembly is configured to rotate its respective wheel member about the respective second axis when the first angular velocity is different from the second angular velocity.

2. The omni traction wheel of claim 1, further comprising a spacing member coupled between the first and second gears, the spacing member configured to maintain a constant distance between the first and second gears.

3. The omni traction wheel of claim 2, wherein the spacing member has
   a first disc operatively coupled to the first gear,
   a second disc operatively coupled to the second gear, and
   an axle coupled between the first and second discs, such that the first disc, the second disc, and the axle are configured to remain angularly stationary while the first and second gears are rotated by the rotary device.

4. The omni traction wheel of claim 3, wherein each peripheral wheel assembly has a brace member for operatively connecting the respective wheel member to the first or second disc of the spacing member.

5. The omni traction wheel of claim 3, wherein the connecting gear of each peripheral wheel assembly has a radial axle for connecting the proximal and distal ends of the connecting gear, such that the radial axle is orthogonal to a central axle of the spacing member.

6. The omni traction wheel of claim 1, wherein the first and second gears define a cylindrical space therebetween, the cylindrical space having a circumferential region, and wherein the connecting gear of each peripheral wheel assembly is configured to revolve along the circumferential region at a common angular velocity of the first angular velocity and the second angular velocity.

7. The omni traction wheel of claim 1, wherein the first and second gears are parallel to a plane positioned in the middle of the first and second gears, and wherein the wheel member of each peripheral wheel assembly is symmetrical along the plane.

8. The omni traction wheel of claim 1, wherein the connecting gear of each peripheral wheel assembly is configured to rotate clockwise about its radial axis when the first angular velocity is greater than the second angular velocity and to rotate counterclockwise about its radial axis when the first angular velocity is lesser than the second angular velocity.

9. The omni traction wheel of claim 1, wherein the wheel member of each peripheral wheel assembly has a first wheel, a second wheel, and a wheel axle centrally coupled between the first and second wheels, the first wheel having a receiving gear for engaging the proximal end of its connecting gear.

10. A transportation system having an omni traction wheel, comprising:
    left and right gears centrally aligned along a first axis, the left and right gears defining a cylindrical space therebetween, the cylindrical space having a circumferential region;
    a plurality of peripheral wheel assemblies distributed along the circumferential region of the cylindrical space, each having:
        a pair of wheels centrally aligned along a second axis, the second axis orthogonal to the first axis, and
        a connecting gear having a distal end for engaging the left and right gears and a proximal end for engaging the pair of wheels, the distal end and the proximal end defining a radial axis, the radial axis parallel to a common radius of the left and right gears and orthogonal to the first axis and the second axis; and
    a rotary device for rotating the left gear about the first axis at a left angular velocity and for rotating the right gear about the first axis at a right angular velocity,
    whereby the connecting gear of each peripheral wheel assembly is configured to rotate its respective pair of wheels about the respective second axis at a lateral angular velocity defined by a differential angular velocity between the left angular velocity and the right angular velocity, and
    whereby the connecting gear of each peripheral wheel assembly is configured to revolve along the circumferential region at a common angular velocity of the left angular velocity and the right angular velocity.

11. The transportation system of claim 10, further comprising a spacing member coupled between the left and right gears, the spacing member configured to maintain a constant distance between the left and right gears, the spacing member having:
    a left disc operatively coupled to the left gear,
    a right disc operatively coupled to the right gear, and
    an axle coupled between the left and right discs, such that the left disc, the right disc, and the axle are configured to remain angularly stationary while the left and right gears are rotated by the rotary device.

12. The transportation system of claim 11, wherein each peripheral wheel assembly has a brace member for operatively connecting the respective wheel member to the left or right disc of the spacing member.

13. The transportation system of claim 10, wherein the pair of wheels of each peripheral wheel assembly has a first wheel, a second wheel, and a wheel axle centrally coupled between the first and second wheels, the first wheel having a receiving gear for engaging the proximal end of the respective connecting gear.

14. An omni traction wheel, comprising:
    first and second plates centrally aligned along a first axis;
    a plurality of peripheral wheel assemblies, each having:
        a wheel member centrally aligned along a second axis, the second axis orthogonal to the first axis, and
        a connecting member having a distal end for engaging the first and second plates and a proximal end for engaging the wheel member, the distal end and the proximal end defining a radial axis, the radial axis parallel to a common radius of the first and second plates and orthogonal to the first axis and the second axis; and
    a rotary device for rotating the first plate about the first axis at a first angular velocity and for rotating the second plate about the first axis at a second angular velocity,
    whereby the connecting member of each peripheral wheel assembly is configured to rotate its respective wheel member about the respective second axis when the first angular velocity is different from the second angular velocity.

15. The omni traction wheel of claim 14, wherein the first and second plates each has a frictional surface for engaging the distal end of the connecting member of each peripheral wheel assembly.

16. The omni traction wheel of claim 14, wherein the wheel member of each peripheral wheel assembly has a frictional surface for engaging the proximal end of the respective connecting member.

* * * * *